US011864290B1

(12) United States Patent
Puvanakijjakorn et al.

(10) Patent No.: US 11,864,290 B1
(45) Date of Patent: Jan. 2, 2024

(54) DIM-TO-WARM LIGHTING

(71) Applicant: Wangs Alliance Corporation, Port Washington, NY (US)

(72) Inventors: Voravit Puvanakijjakorn, Port Washington, NY (US); Jonathan Ian Hoffman, Bay Shore, NY (US); Bingzhu Yan, Guangdong Province (CN)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 17/842,260

(22) Filed: Jun. 16, 2022

Related U.S. Application Data

(60) Provisional application No. 63/302,452, filed on Jan. 24, 2022.

(51) Int. Cl.
*H05B 45/35* (2020.01)
*F21V 23/02* (2006.01)
*H05B 45/3577* (2020.01)
*H05B 45/28* (2020.01)

(52) U.S. Cl.
CPC ....... *H05B 45/3577* (2020.01); *F21V 23/023* (2013.01); *H05B 45/28* (2020.01)

(58) Field of Classification Search
None
See application file for complete search history.

(56) References Cited

U.S. PATENT DOCUMENTS

| | | | | |
|---|---|---|---|---|
| 10,299,321 | B1 * | 5/2019 | Trask | H05B 45/20 |
| 2007/0222399 | A1 | 9/2007 | Bondy et al. | |
| 2011/0115399 | A1 | 5/2011 | Sadwick et al. | |
| 2017/0064790 | A1 | 3/2017 | Clark et al. | |
| 2017/0108235 | A1 | 4/2017 | Guan et al. | |
| 2017/0374718 | A1 * | 12/2017 | Fang | H05B 45/46 |
| 2019/0098734 | A1 | 3/2019 | Dolan | |
| 2020/0100334 | A1 | 3/2020 | Han | |
| 2022/0053617 | A1 * | 2/2022 | Zhang | H05B 45/385 |
| 2023/0031367 | A1 | 2/2023 | Li et al. | |

(Continued)

OTHER PUBLICATIONS

"3.5"OCULUX Dim-To-Warm," WAC Lighting, Jan. 2018.

(Continued)

*Primary Examiner* — Dedei K Hammond
(74) *Attorney, Agent, or Firm* — Weiss & Arons LLP

(57) ABSTRACT

Apparatus and methods for lighting. The apparatus may include a power supply. The apparatus may include a controller. The controller may be configured to receive power from the power supply. The controller may be configured to receive a dimming signal generated external to the controller. The controller may be configured to receive from a user selection that includes a CCT partition set-point. The controller may be configured to transmit to a light source lighting power. The lighting power may correspond to the dimming signal. The lighting power may correspond to the CCT partition set-point. The light source may include a high correlated color temperature ("CCT") LED. The light source may include a low CCT LED. The CCT partition set-point may correspond to a selected value of a partition of power between the high CCT LED and the low CCT LED.

16 Claims, 24 Drawing Sheets

(56) References Cited

U.S. PATENT DOCUMENTS

2023/0319960 A1 10/2023 Casey

OTHER PUBLICATIONS

"Cube Power Dynamic COB Warm Dimming Product Datasheet," Luminus, Inc. Feb. 8, 2018.
"International Search Report and Written Opinion in International Application No. PCT/US2023/011119," dated Feb. 28, 2023.
"CTM1C Family: Round LED Color Tuning Light Engines," www.erp-power.com. Aug. 26, 2021.

* cited by examiner

PCB2-B

PCB2-C

PCB2-D

DIM-TO-WARM LIGHTING

CROSS-REFERENCE TO RELATED APPLICATIONS

This is a non-provisional of U.S. Provisional Application No. 63/302,452, filed on Jan. 24, 2022, which is hereby incorporated by reference in its entirety.

BACKGROUND

LED lighting is often controlled by dimmers. As lighting power is reduced, an overall correlated color temperature ("CCT") of the lighting may change. The CCT may be based on a ratio of power distributed to high CCT lighting elements and low CCT lighting elements. Different ratios may provide different overall CCT of the lighting. Different users may have different preferences for the CCTs at different lighting power levels. In particular, different users may have different preferences for the overall CCT at selected lighting levels.

It would therefore be desirable to provide apparatus and methods for providing different CCT at selected lighting levels.

Figure 1:
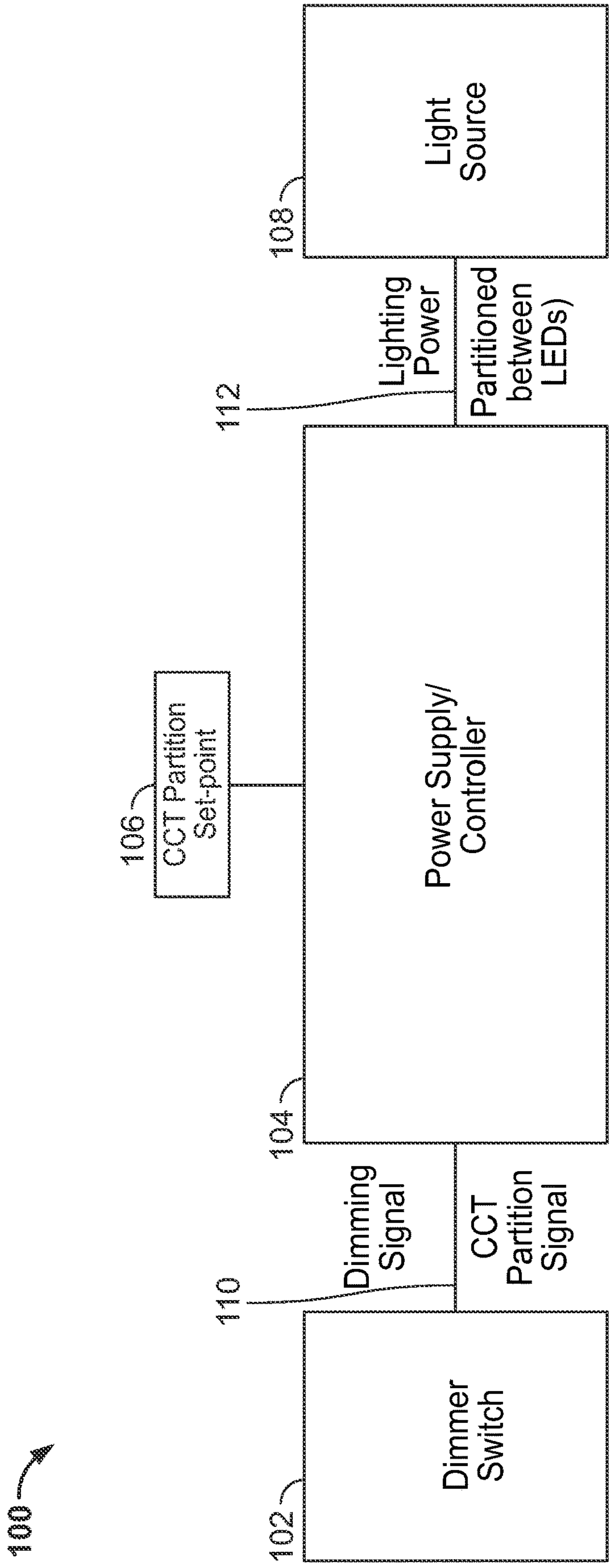
FIG. 1 shows schematically illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DESCRIPTION

Apparatus and methods for lighting are provided.

The apparatus may include a power supply. The apparatus may include a controller. The controller may be configured to receive a dimming signal. The dimming signal may be a dimming signal that is generated by a dimmer switch that is external to the controller.

The controller may be configured to receive the dimming signal from a dimmer switch; and to not receive the CCT partition set-point from the dimmer switch. The dimmer switch may be a dimmer switch that is not configured to provide the CCT partition set-point. The dimmer switch may be a dimmer switch that does not provide the CCT partition set-point. The dimmer switch may be a commercially available dimmer switch. The dimmer switch may be a wall-mounted switch.

The controller may be configured to transmit power to a light source.

The light source may include one or more LEDs. The LEDs may have a uniform color. The LEDs may include LEDs of different colors. The LEDs may include one or more strings of LEDs. The LEDs of a string may be of a uniform color. The LEDs of a string may be of different colors. The colors may include red, green, blue, violet, amber, white, of any suitable CCT, and any other suitable color.

The light source may include one or more high CCT LEDs. The light source may include one or more low CCT LEDs. The controller may provide lighting power to the LEDs. The lighting power may be limited by the dimming signal.

The controller may be configured to receive a CCT partition signal. The CCT partition signal may be a CCT partition signal that is generated by a dimmer switch that is external to the controller. The CCT partition signal may instruct the controller to distribute the lighting power between high CCT LED strings and low CCT LED strings. This may provide an illumination that is produced by a combination of the high CCT LEDs and the low CCT LEDs. The combination may provide an overall illumination CCT that is intermediate between the high and low CCTs. A high-CCT partition may be weighted toward the high CCT. A low-CCT partition may be weighted toward the low CCT.

The partition may range from 0 (all power to low CCT LEDs) to 1 (all power to high CCT LEDs). The partition may be expressed as $$P = \frac{\text{power to high } CCT\ LEDS}{\text{power to high } CCT\ LEDs + \text{power to low } CCT\ LEDs}, \quad \text{Eq'n. 1}$$

Thus a "high-CCT" partition may be more than 0.5 and a "low-CCT' partition may be less than 0.5.

The controller may be configured to receive from a switch a user selection. The switch may be any suitable multi-position switch. The switch may have 2, 3, 4, 5, 6, 7, 8 or more positions The positions may be user-selectable. The switch may be a Model SS-25D01 vertical slide switch, available from Dongguan Zhaoyi Electronics Co., Ltd, Dongguan, Guangdong, China, or any other suitable switch.

The user selection may include a CCT partition set-point. The CCT partition set-point may be a CCT partition that the user selects for operation of the light source when the light source operates at a particular lighting power. For example, the user may select a warm CCT partition for a low lighting power. The user may select a warm CCT partition for a high lighting power. The user may select a cool CCT partition for a low lighting power. The user may select a cool CCT partition for a high lighting power.

The controller may be configured to apply the CCT partition set-point when the lighting power reaches the high lighting power. The controller may be configured to apply the CCT partition set-point when the lighting power reaches the low lighting power. The high lighting power may be a default lighting power that is stored in the controller. The low lighting power may be a default lighting power that is stored in the controller. The high lighting power may be an operational high power limit of the controller or the LEDs. The low lighting power may be an operation low power limit of the controller or the LEDS. The high lighting power may be included in a range from 0 to 100%, including all subranges of 1%, 5%, 10% and 20%, and any combinations thereof, of a nominal maximum lighting power for the LEDs. The low lighting power may be included in a range from 100 to 0%, including all subranges of 1%, 5%, 10% and 20%, and any combinations thereof, of a nominal maximum lighting power for the LEDs.

A lighting power at which the CCT partition set-point is applied may be referred to as a preset lighting power ("PSLP").

The user may select the PSLP. The user may select different CCT partition set-points for different PSLPs.

The controller may be configured to provide to the light source a lighting power corresponding to the dimming signal. The controller may be configured to provide to the light source a CCT partition corresponding to the lighting power. The controller may be configured to provide to the LEDs lighting power that corresponds to the CCT partition set-point.

The controller may include a correlation between the lighting power and the CCT partition. The correlation may determine a CCT partition for each lighting power. The correlation may be constrained to provide the CCT partition set-point at a PSLP.

The user selection may include a selection of the correlation. The correlation may be defined by a look-up table. The correlation may be defined by a mathematical formula. The correlation may be defined by coefficients of a mathematical formula. The user selection may include a selection of a functional form of the correlation. Different functional forms may result in different rates of change of the CCT partition with lighting power.

The controller may include a CCT partition set-point switch that is configured to receive the user selection. The CCT partition set-point switch may be a mechanical switch.

The apparatus may include a housing. The controller may be disposed in the housing. The CCT partition set-point switch may be fixed to the housing. The CCT partition set-point switch may be fixed to an exterior of the housing. The CCT partition set-point switch may be in electronic communication with the controller. The CCT partition set-point switch may be operable by a user from outside the housing.

The controller may receive the dimming signal from a 0-10V dimmer switch. The CCT partition set-point switch may be in electronic communication with a processor in the controller. The processor may be configured to produce the partition based on a dimming signal set at the dimmer switch.

The controller may receive the dimming signal from a phase-cut dimmer switch. The CCT partition set-point switch may be in electronic communication with a processor in the controller. The processor may be configured to produce the partition based on a dimming signal set at the dimmer switch.

The CCT partition set-point switch may be configured to receive a wireless signal that includes the user selection.

FIG. 1 shows illustrative lighting arrangement 100. The arrangement may include a dimmer. The arrangement may include a power supply. The arrangement may include a lighting controller. The arrangement may include a switch. The arrangement may include a light switch.

The dimmer may provide user controls. The user may use the controls to adjust a lighting power of the light source. The user may use the controls to adjust a correlated color temperature of the light source. The dimmer may provide to the controller a dimming signal. The dimming signal may correspond to the lighting power. The dimming signal may correspond to the correlated color temperature ("CCT").

The controller may be configured to receive the dimming signal. The controller may provide lighting power to the light source. The lighting power may be distributed to light emitting diodes ("LEDs") of the light source. The lighting power may be partitioned between high-CCT LEDs and low-CCT LEDs. The lighting power may be a total lighting power of the high-CCT LEDs and the low-CCT LEDs. The partitioning may be proportional to a color CCT partition of the two CCTs.

The controller may include code that maps a lighting power to a CCT partition set-point ratio. The code may be implemented in software. The code may be implemented in firmware. The code may define the correlation between the lighting power and the CCT partition set-point ratio.

The switch may include hardware. The switch may be disposed on a housing of the controller.

The switch may include software. The switch may be implemented on a wired or wireless device that is in communication with the controller.

Table 1 lists illustrative ranges that may include nominal CCT values for the first and second CCTs.

TABLE 1

Illustrative ranges that may include nominal CCT values for the first and second CCTs

| Illustrative ranges (° K) | |
|---|---|
| Lower | Upper |
| <1800 | 1800 |
| 1800 | 1900 |
| 1900 | 2000 |
| 2000 | 2100 |
| 2100 | 2200 |
| 2200 | 2300 |
| 2300 | 2400 |
| 2400 | 2500 |
| 2500 | 2600 |
| 2600 | 2700 |
| 2700 | 2800 |
| 2800 | 2900 |
| 2900 | 3000 |
| 3000 | 3100 |
| 3100 | 3200 |
| 3200 | 3300 |
| 3300 | 3400 |
| 3400 | 3500 |

TABLE 1-continued

Illustrative ranges that may include nominal CCT values for the first and second CCTs
Illustrative ranges (° K)

| Lower | Upper |
|---|---|
| 3500 | 3600 |
| 3600 | 3700 |
| 3700 | 3800 |
| 3800 | 3900 |
| 3900 | 4000 |
| 4000 | 4100 |
| 4100 | 4200 |
| 4200 | 4300 |
| 4300 | 4400 |
| 4400 | 4500 |
| 4500 | 4600 |
| 4600 | 4700 |
| 4700 | 4800 |
| 4800 | 4900 |
| 4900 | 5000 |
| 5000 | >5000 |
| Other suitable lower limits | Other suitable upper limits |

The switch may have settings corresponding to one or more of the CCTs.

FIG. 1 shows illustrative lighting arrangement 100. Arrangement 100 may include dimmer switch 102. Arrangement 100 may include power supply and controller 104. Arrangement 100 may include CCT partition set-point switch 106. Arrangement 100 may include light source 108. Light source 108 may include one or more LEDs.

Dimmer switch 102 may be any suitable dimmer. Dimmer switch 102 may be a commercially available dimmer switch. Dimmer switch 102 include a forward phase cut dimmer switch (e.g., magnetic low voltage ("MLV") or Triac). Dimmer switch 102 may include a reverse phase dimmer switch (e.g., electronic low voltage ("ELV")). Dimmer switch 102 may include a 0-10V dimmer switch. Dimmer switch 102 may be a wall-mounted dimmer switch.

Dimmer switch 102 may be in communication with power supply and controller 104 via channel 110. Channel 110 may include a wired electronic communication channel. Channel 110 may include a wireless communication channel. Dimmer switch 102 may transmit a dimming signal along channel 110. The dimming signal may include a forward phase cut dimming signal (e.g., a magnetic low voltage ("MLV") or Triac signal). The dimming signal may include a reverse phase dimming signal (e.g., electronic low voltage ("ELV") signal). The dimming signal may include a 0-10V dimming signal. The dimming signal may include a digital dimming signal. The digital dimming signal may include a digital dimming command.

Dimmer switch 102 may transmit a CCT partition signal along channel 110.

Dimmer switch 102 may include user controls (not shown). A user may use the controls to adjust a lighting power of light source 108. The user may use the controls to adjust a CCT of light source 108. The user may use the controls to adjust a CCT partition of light source 108. The lighting power provided to light source 108 may correspond to the dimming signal. The CCT of light source 108 may correspond to the power. The CCT of light source 108 may correspond to the dimming signal.

Power supply and controller 104 may include a power supply and a controller that are housed in a single unit. Power supply and controller 104 may include a power supply and a controller that are housed in separate units.

Power supply and controller 104 may receive power for operating light source 108 from dimmer switch 102. Power supply and controller may receive power for operating light source 108 from a source other than dimmer switch 102. Table 2 shows illustrative characteristics of power supply and controller 104.

TABLE 2

Illustrative characteristics of power supply and controller 104.
Illustrative characteristics

| Input | Output | Dimming Format |
|---|---|---|
| 120-277 VAC | 24 VDC | ELV @ 120 VAC |
| 50/60 Hz | 4.0 A | 0-10 V @ 120-277 VAC |
| 1.0 A | 96 W (Class 2) | Triac |
| PF ≥ 0.9 | Any other suitable inputs, input values or ranges of input values | Digital/IoT command |
| Any other suitable inputs, input values or ranges of input values | | Any other suitable dimming format |

Power supply and controller 104 may be in communication with light source 108 via channel 112. Channel 112 may include a wired power transmission line. Channel 112 may include a wired electronic communication channel. Channel 110 may include a wireless communication channel. Power supply and controller 104 may transmit lighting power to light source 108 via channel 112. Power supply and controller 104 may transmit a CCT partition to light source 108 via channel 112.

The lighting power may be distributed to light emitting diodes ("LEDs") of light source 108. The lighting power may be partitioned between high-CCT LEDs and low-CCT LEDs (not shown).

Dimmer switch 102 may be used to change the power of light source 108. Light source 108 may be operated at a high illumination power. Light source 108 may be dimmed to a low illumination power. At the high illumination power, light source 108 may have a high power CCT partition. At the low illumination power, light source 108 may have a low power CCT partition.

A user may use switch 106 to provide the user selection to power supply and controller 104. Power supply and controller 104 may include the correlation.

Figure 2:
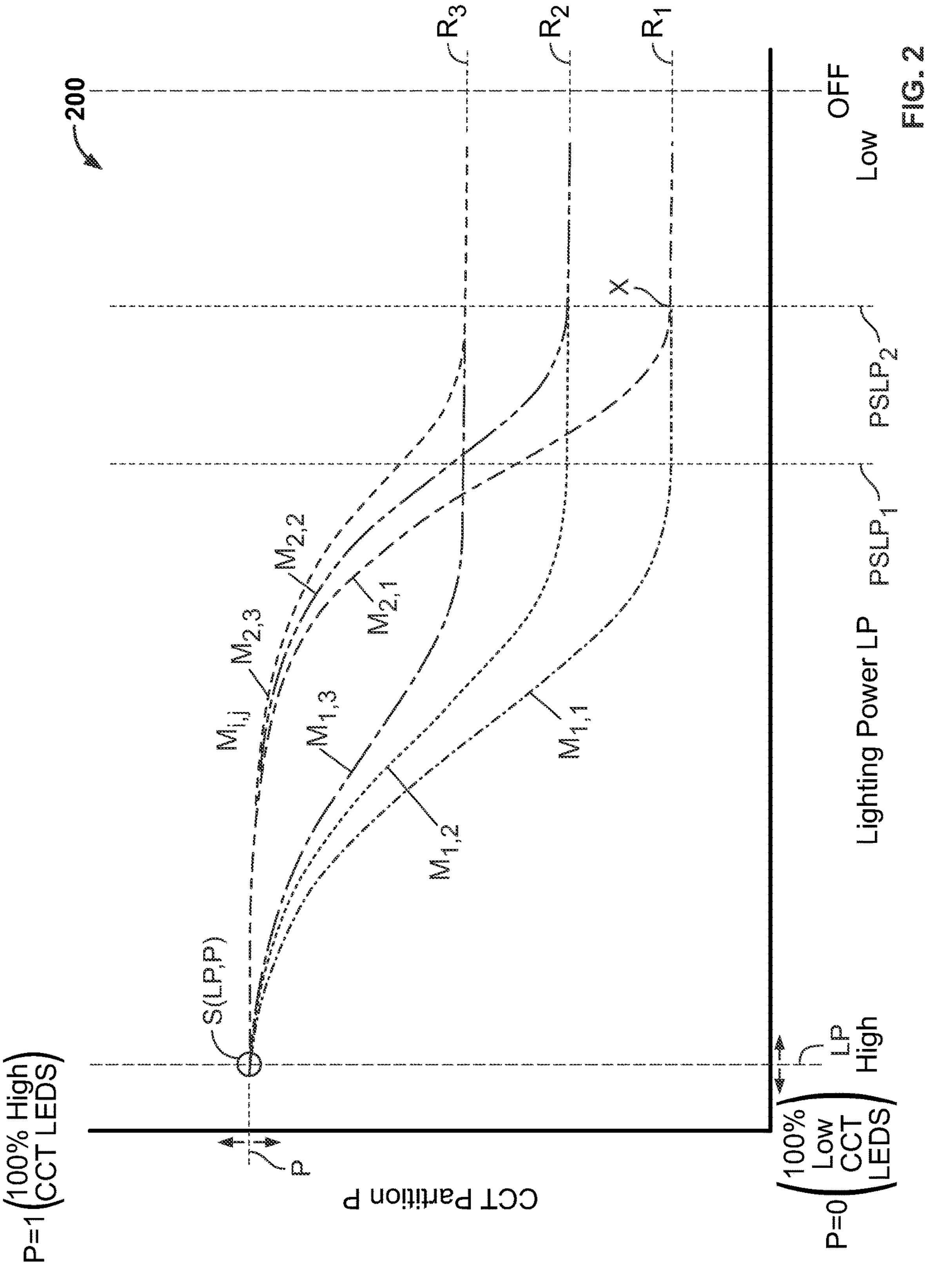
FIG. 2 shows illustrative information in accordance with principles of the invention.

FIG. 2 shows illustrative lighting power-CCT correlation scheme 200. The horizontal axis may represent a total lighting power (LP) for the high CCT LEDs and the low CCT LEDs in light source 108. The vertical axis may represent a partitioning P of power between the high CCT LEDs and the low CCT LEDs in light source 108. The partitioning may range, for example, from delivery of 100% of the lighting power to low CCT LEDs to delivery of 100% of the lighting power to high CCT LEDs. The partitioning may be linear over the range of LP. The partitioning may be non-linear over the range of LP.

CCT Scheme 200 may include CCT partition curves $M_{i,j}$. i may indicate a preset lighting power $PSLP_k$ such as $PSLP_1$ or $PSLP_2$. $_j$ may indicate a CCT partition set-point $R_1$ such as $R_1$, $R_2$ or $R_3$. CCT partition set-point switch 106 may be used to select a $PSLP_k$. Switch 106 may be used to select a CCT partition set-point $R_1$.

Curves $M_{i,j}$ may be defined in power supply and controller 104. Curves $M_{i,j}$ may be stored in power supply and controller 104. Curves $M_{i,j}$ may be calculated in power supply and controller 104. Curves $M_{i,j}$ may be stored in power supply and controller 104.

Each of curves $M_{i,j}$ may identify a CCT value that is to be displayed in connection with a given lighting power level.

A user may select a preset lighting power PSLP such as $PSLP_2$. The user may set a CCT partition set-point. The CCT partition set-point may correspond to a CCT partition R such as $R_1$. The user may set scene S. Scene S may be defined by a lighting power LP. Scene S may be defined by a partition P. Scene S may be defined by a lighting power LP and a partition P.

When the light source is set to scene S, the user may use dimmer switch 102 to reduce the lighting power of light source 108. The reduction may proceed in discrete steps. The reduction may be a continuous reduction. Power supply and controller 104 may detect the reduction. Power supply and controller 104 may determine a curve $M_{2,1}$ that is constrained by scene S, $PSLP_2$ and $R_1$. For each reduced lighting power between scene S and $PSLP_2$, power supply and controller 104 may control light source 108 to provide light having a CCT corresponding to $M_{2,1}$. Target X is the CCT partition set-point defined by $R_1$. $M_{2,1}$ may be flat between target X and OFF.

Figure 3:
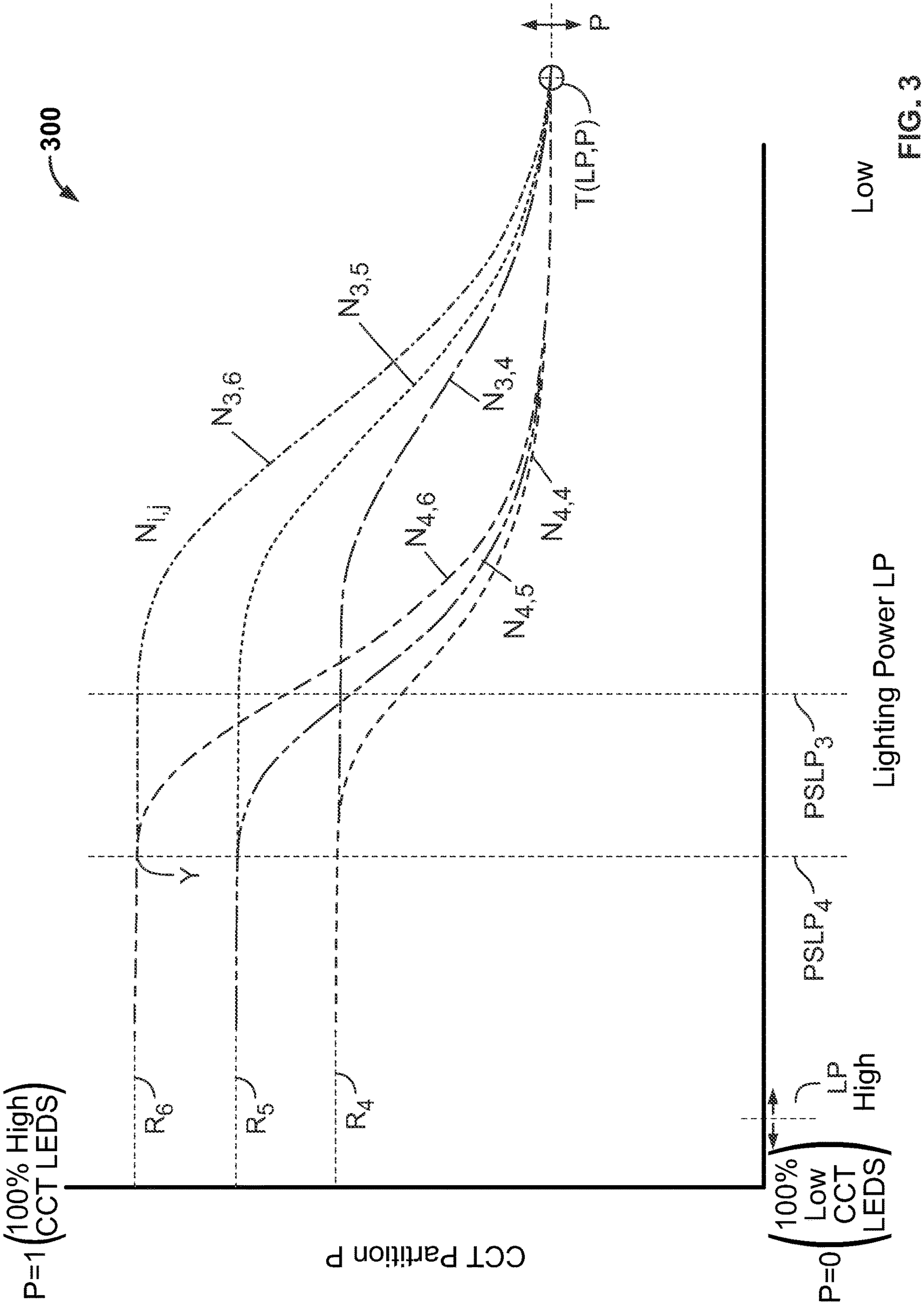
FIG. 3 shows illustrative information in accordance with principles of the invention.

FIG. 3 shows illustrative lighting power-CCT correlation scheme 300. The horizontal axis may represent a total lighting power LP for the high CCT LEDs and the low CCT LEDs in light source 108. The vertical axis P may represent a partitioning of power between the high CCT LEDs and the low CCT LEDs in light source 108. The partitioning may range, for example, from delivery of 100% of the lighting power to low CCT LEDs to delivery of 100% of the lighting power to high CCT LEDs. The partitioning may be linear over the range. The partitioning may be non-linear over the range.

CCT scheme 300 may include CCT partition curves $N_{i,j}$. i may indicate a preselected lighting power $PSLP_k$ such as $PSLP_3$ or $PSLP_4$. j may indicate a CCT partition $R_1$ such as $R_4$, $R_5$ or $R_6$. CCT partition set-point switch 106 may be used to select a $PSLP_k$. Switch 106 may be used to select an $R_1$.

Curves may be defined in power supply and controller 104. Curves may be stored in power supply and controller 104. Curves $N_{i,j}$ may be calculated in power supply and controller 104. Curves may be stored in power supply and controller 104.

Each of curves $N_{i,j}$ may identify a CCT value that is to be displayed in connection with a given lighting power level.

A user may select a preset lighting power PSLP such as $PSLP_4$. The user may set a CCT partition set-point. The CCT partition set-point may correspond to a CCT partition R such as R6. The user may set scene T. Scene T may be defined by a lighting power LP. Scene S may be defined by a partition P. Scene S may be defined by both a lighting power LP and a partition P.

When the light source is set to scene T, the user may use dimmer switch 102 to increase the lighting power of light source 108. The increase may proceed in discrete steps. The increase may be a continuous increase. Power supply and controller 104 may detect the increase. Power supply and controller 104 may determine a curve N4,6 that is constrained by scene T, PSLP4 and R6. For each increased lighting power between scene T and PSLP4, power supply and controller 104 may control light source 108 to provide light having a CCT corresponding to N4,6. Target Y is the CCT partition set-point defined by R1. N4,6 may be flat between target Y and a higher LP.

Figure 4:
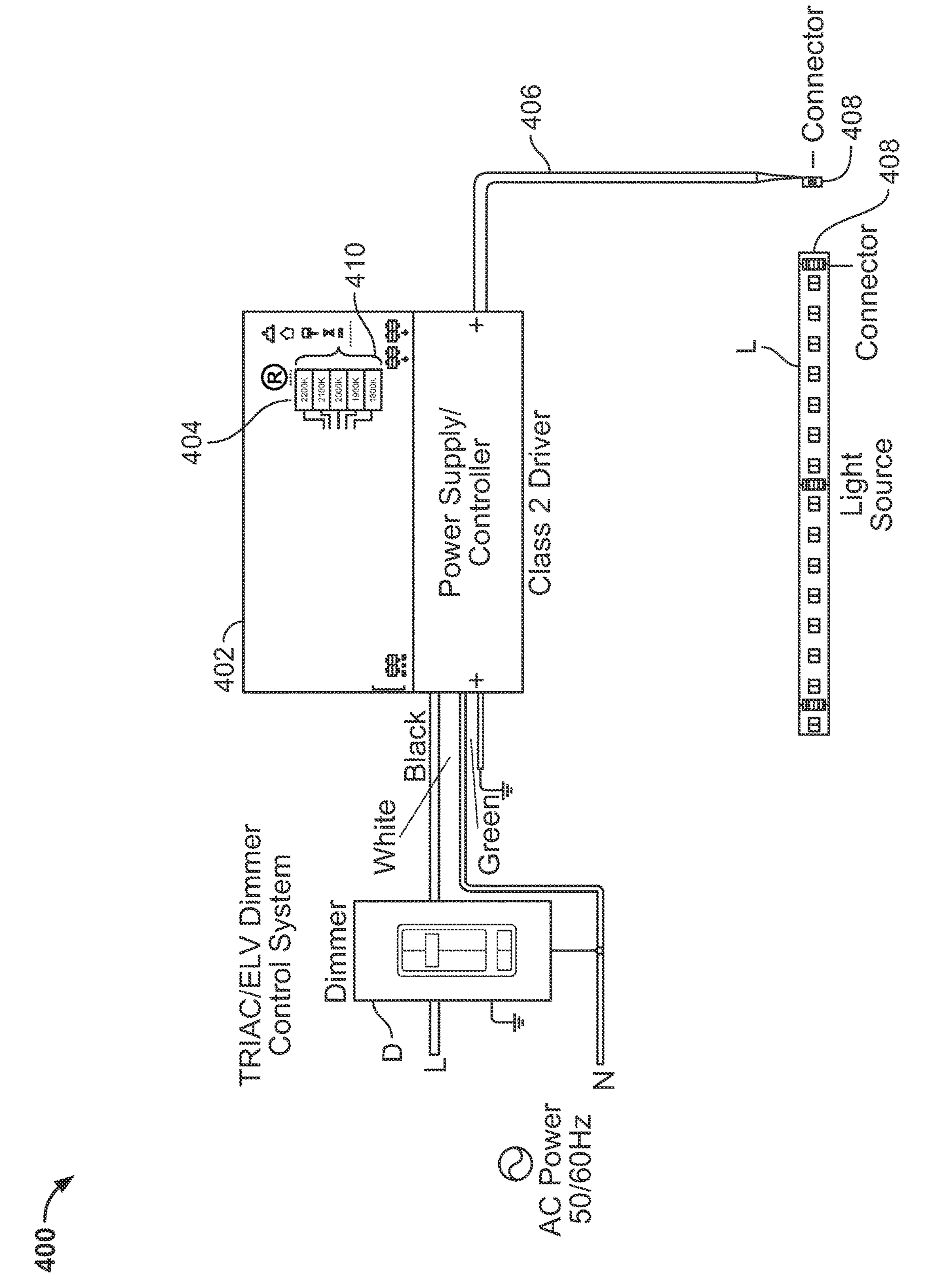
FIG. 4 shows schematically illustrative apparatus in accordance with principles of the invention.

FIG. 4 shows illustrative lighting arrangement 400. Arrangement 400 may have one or more features in common with lighting arrangement 100. Lighting arrangement 400 may include TRIAC or ELV dimmer switch D. Dimmer switch D may have a neutral wire. Dimmer switch D may be a dimmer that does not have a neutral wire. Arrangement 400 may include power supply and controller 404. Dimmer switch D may be wired to power supply and controller 402. Partition set-point switch 404 may be mounted on power supply and controller 402. Partition set-point switch 404 may be mounted in controller 402. Controller 402 may be connected to light source L via cable 406. Cable 406 may be connected to light source L by connector 408.

Partition set-point switch 404 may include selectable partition set-points 410.

Figure 5:
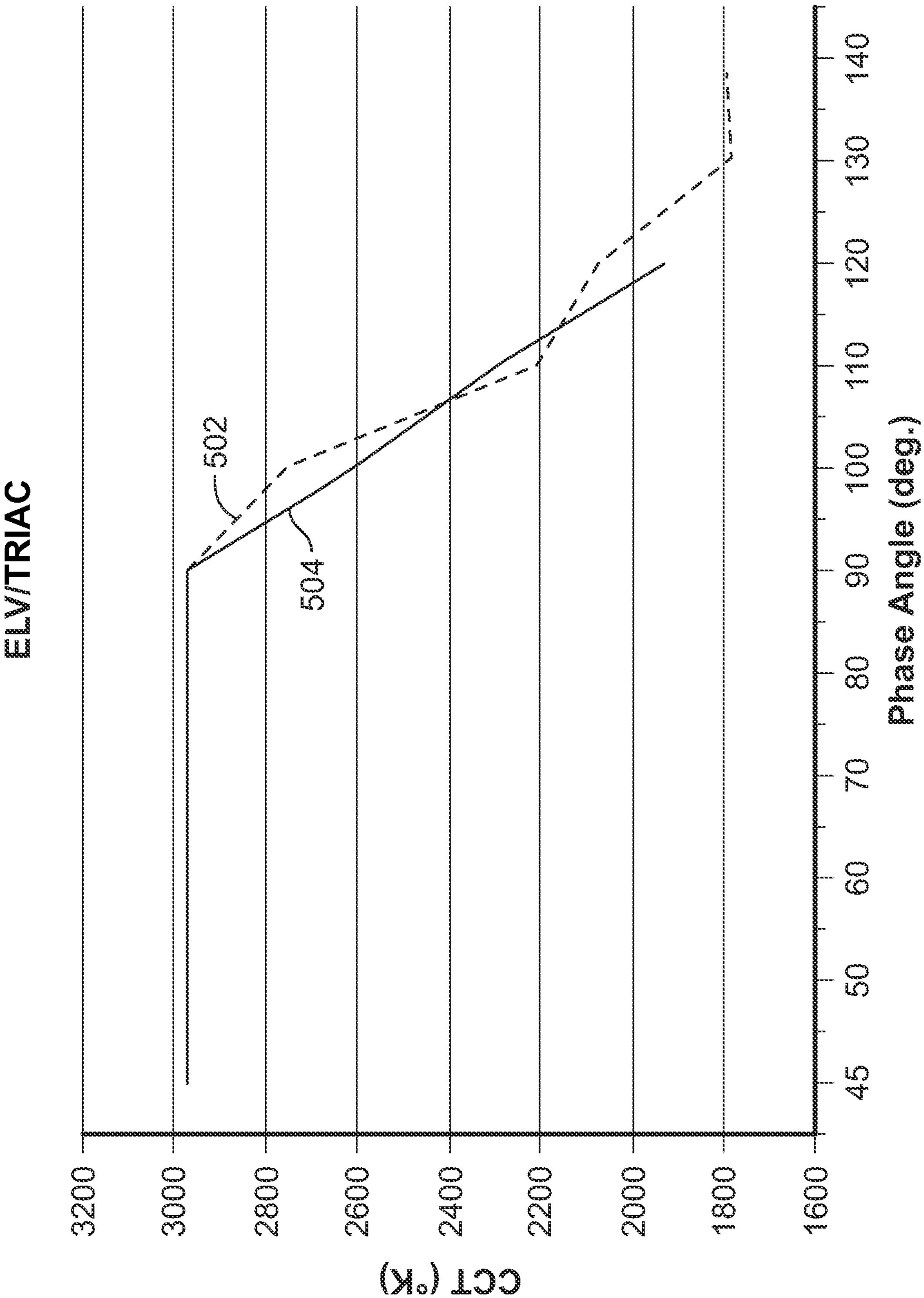
FIG. 5 shows illustrative information in accordance with principles of the invention.

FIG. 5 shows two illustrative correlations 502 and 504 corresponding to lighting arrangement 400. The correlations are between a phase angle (x-axis) from the ELV or TRIAC phase-cut dimming signal and a effective CCT, based on a CCT partition between high- and low-CCT LEDs, obtained at the light source. Correlation 502 has a CCT partition set-point of about 1800° K. Correlation 504 has a CCT partition set-point of about 1800. Correlation 502 may correspond to a first dimmer switch. Correlation 504 may correspond to a second dimmer switch.

Figure 6:
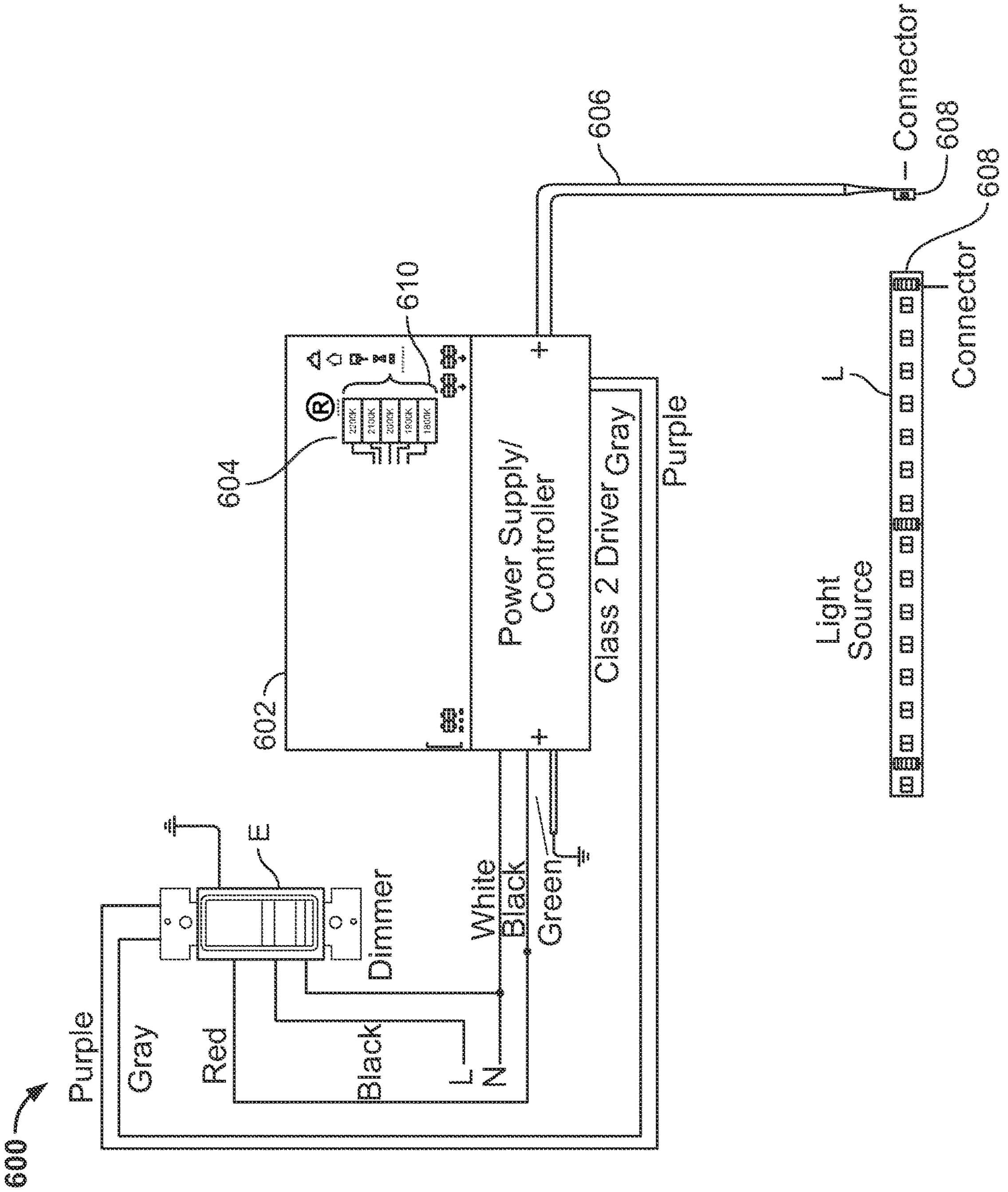
FIG. 6 shows schematically illustrative apparatus in accordance with principles of the invention.

FIG. 6 shows illustrative lighting arrangement 600. Arrangement 600 may have one or more features in common with lighting arrangement 100. Lighting arrangement 600 may include 0-10 VDC dimmer E. Arrangement 600 may include power supply and controller 602. Dimmer E may be wired to the power supply and controller 602. Partition set-point switch 604 may be mounted on the power supply and controller 602. Partition set-point switch 604 may be mounted in power supply and controller 602. Power supply and controller 602 may be connected to light source L via 606 cable. Cable 606 may be connected to light source L by connector 608.

Figure 7:
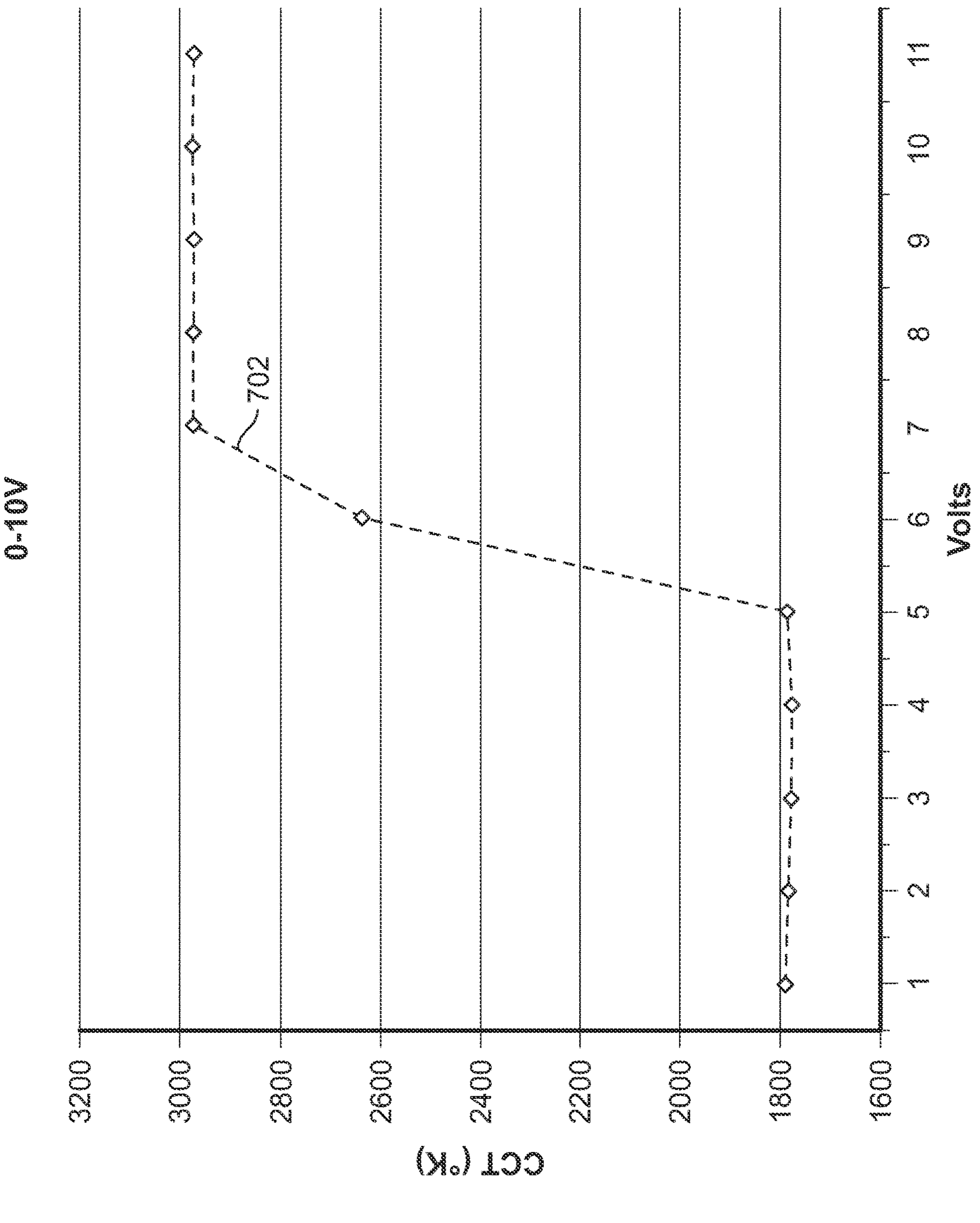
FIG. 7 shows illustrative information in accordance with principles of the invention.

FIG. 7 shows illustrative correlation 702 corresponding to lighting arrangement 600. The correlation may be between a voltage level (e.g., 0-10; x-axis) from the dimming signal of dimmer switch E and an effective CCT, based on a CCT partition between high- and low-CCT LEDs, obtained at the light source. Correlation 702 shows a CCT partition set-point of about 1800° K for the correlation.

Figure 8:
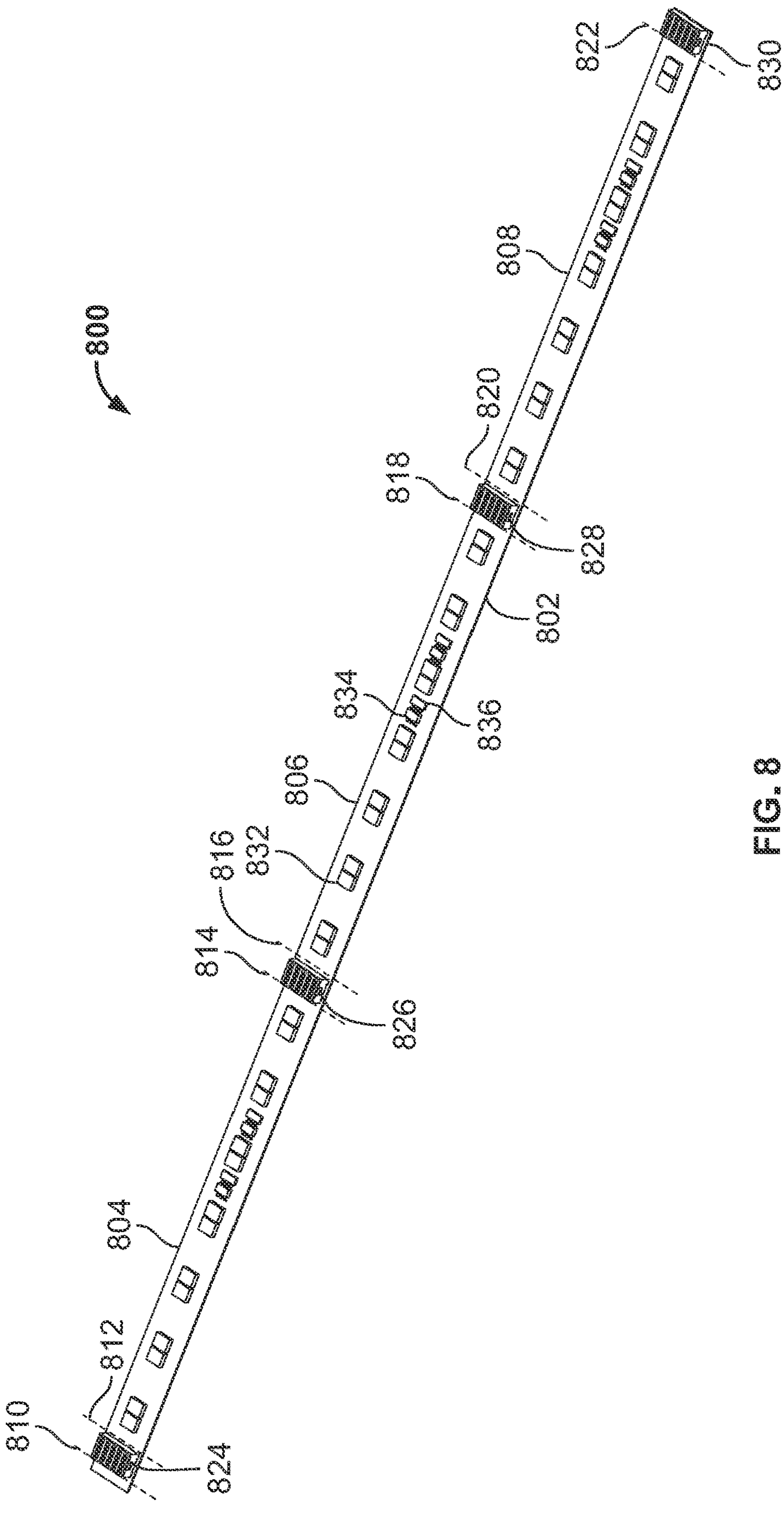
FIG. 8 shows illustrative apparatus in accordance with principles of the invention.

FIG. 8 shows illustrative fixture 800. Fixture 800 may have one or more features in common with the light source of FIG. 1. Fixture 800 may include lamina section 802. Lamina 802 may include sections such as 804, 806 and 808. Segments 804, 806 and 808 may be terminated by break-away joints 810, 812, 814, 816, 818, 820 and 822. Connectors 824, 826, 828 and 830 may be disposed on the lamina section between or adjacent the break-away joints. A user may separate sections and connectors at the break-away joints to provide a desired length of fixture 800.

Fixture 800 may be connected with one or more of contacts of a connector for transmission of electrical power. Fixture 800 may be connected with one or more of contacts of a connector for transmission of communications.

Each section may include a first LED emitter string. Each section may include a second LED emitter string. Emitters in the first string may have a nominal first CCT. Emitters in the second string may have a nominal second CCT. The second CCT may be different from the first CCT.

An emitter having the first CCT may be located adjacent an emitter having the second CCT. Emitter pair 832 may include one emitter having the first CCT and one emitter having the second CCT.

Each string may include a current-regulating chip such as 834 and a dissipative element such as 836. The dissipative element may include a resistor.

Figure 9:
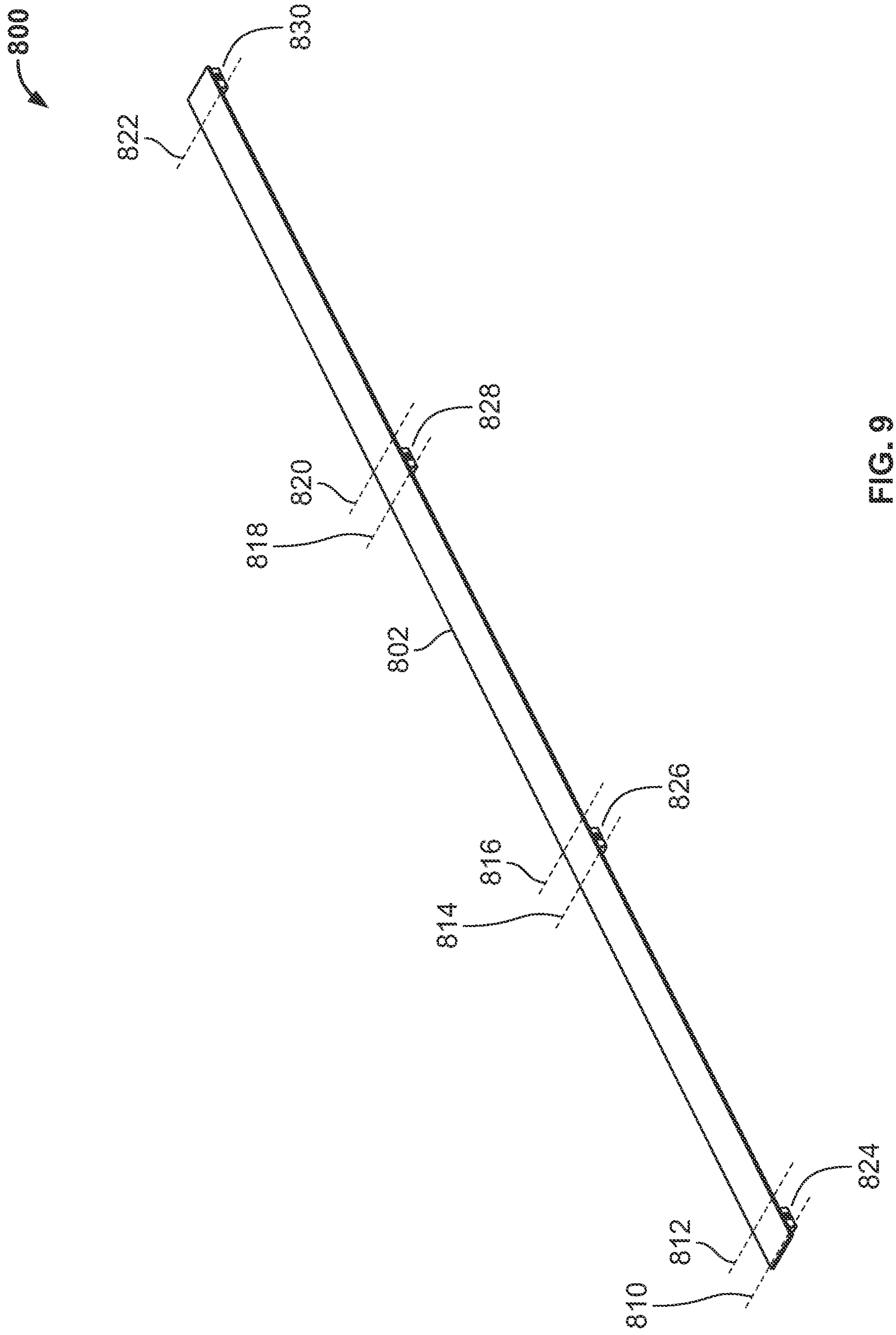
FIG. 9 shows illustrative apparatus in accordance with principles of the invention.

FIG. 9 shows fixture 800 from a view different from that shown in FIG. 8.

Figure 10:
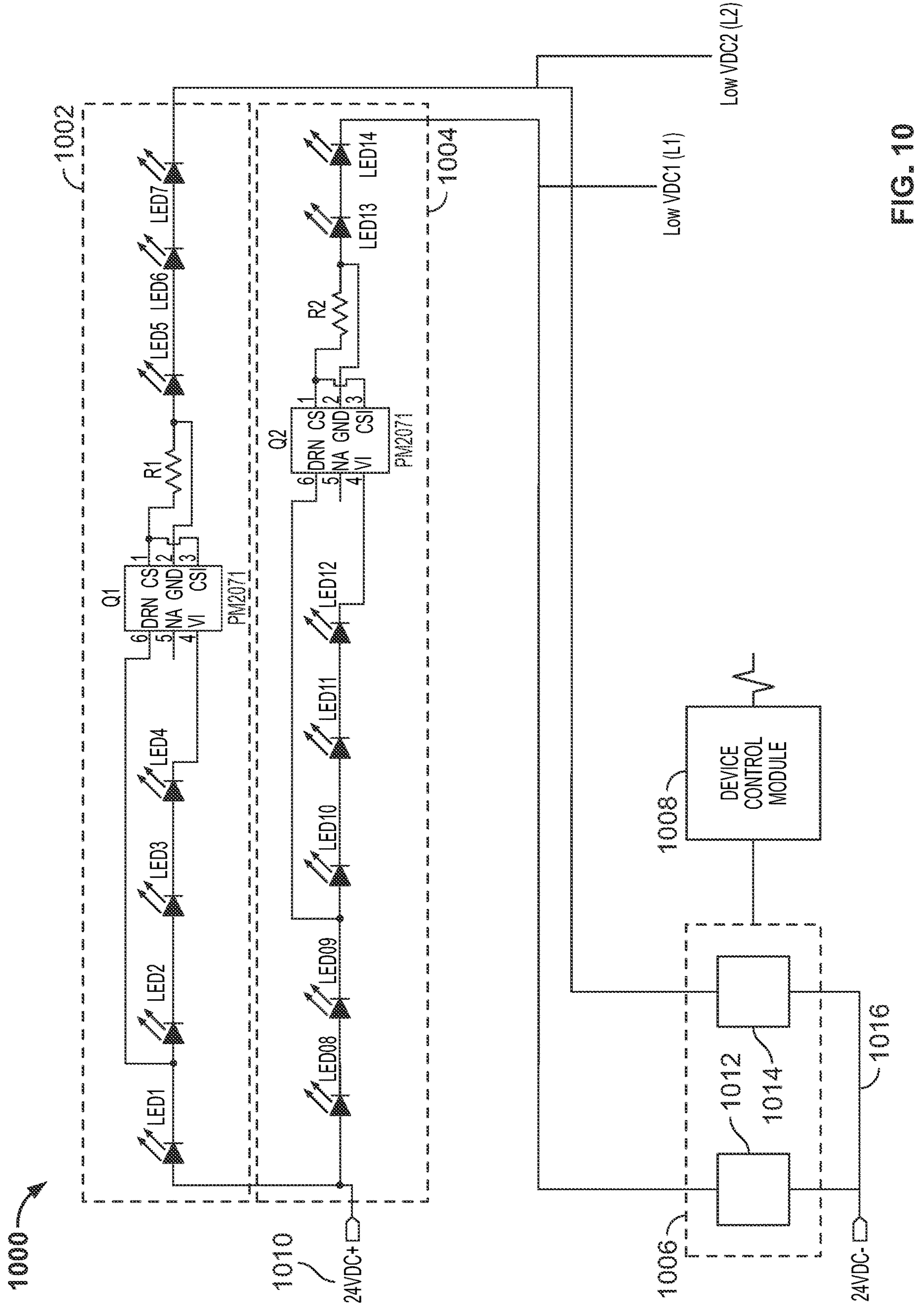
FIG. 10 shows schematically illustrative apparatus in accordance with principles of the invention.

FIG. 10 shows schematically illustrative circuit 1000. Circuit 1000 may have one or more features in common with one or more of the features of arrangement 100. Circuit 1000 may include string 1002. Circuit 1000 may include string 1004. Circuit 1000 may include power supply 1006. Power supply 1006 may be controlled by device control module 1008. One or both of power supply 1006 and 1008 may have one or more features in common with power supply and controller 104.

String 1002 may include high CCT LEDs 1-7 in series with current regulator Q1 and resistor R1. String 1004 may include low CCT LEDs 8-14 in series with current regulator Q2 and resistor R2. Table 3 lists illustrative string 1002 and string 1004 component IDs.

TABLE 3

Illustrative string 1002 and string 1004 component IDs.
Illustrative string 1002 and string 1004 components.

| String 1002 | | String 1004 | |
|---|---|---|---|
| Component | Illustrative ID | Component | Illustrative ID |
| LED 1-7 . . . | 2835W9N-F-Ra95-2P (D04-2HM) 5000K | LED 8-14 | 2835W6N-F-Ra95-2P (H20-2HM) 2700K |
| Q1 | IC PM2071 SOT23-6 RoHS | Q2 | IC PM2071 SOT23-6 RoHS |
| R1 | 1/4 W, 15 R ± 1% (1206) | R2 | 1/4 W, 15 R ± 1% (1206) |
| T | Socket | T | Socket |
| | Other suitable part IDs | | Other suitable part IDs |

Input 1010 may be tied to a 24 VDC terminal of a voltage source.

Power supply 1006 may provide pulse-width modulation ("PWM"), via a MOSFET in line 1012, corresponding to Low $VDC_1$ ("L1") of string 1002. Power supply 1006 may provide pulse-width modulation ("PWM"), via a MOSFET in line 1014, corresponding to Low $VDC_2$ ("L2") of string 1004. Power supply 1006 may provide separately controllable PWM to lines 1012 and 1014. The power modulation may, for each line, reduce power output of the LEDs. By reducing power to one string relative to the other, a CCT partition may be achieved. Low end 1016 of power supply 1006 may be in communication with a −24 VDC source.

Each section of circuit 1000 may include a pair of strings such as 1002 and 1004. Strings of different sections may run from a common high voltage rail to a common low voltage rail.

Figure 11:
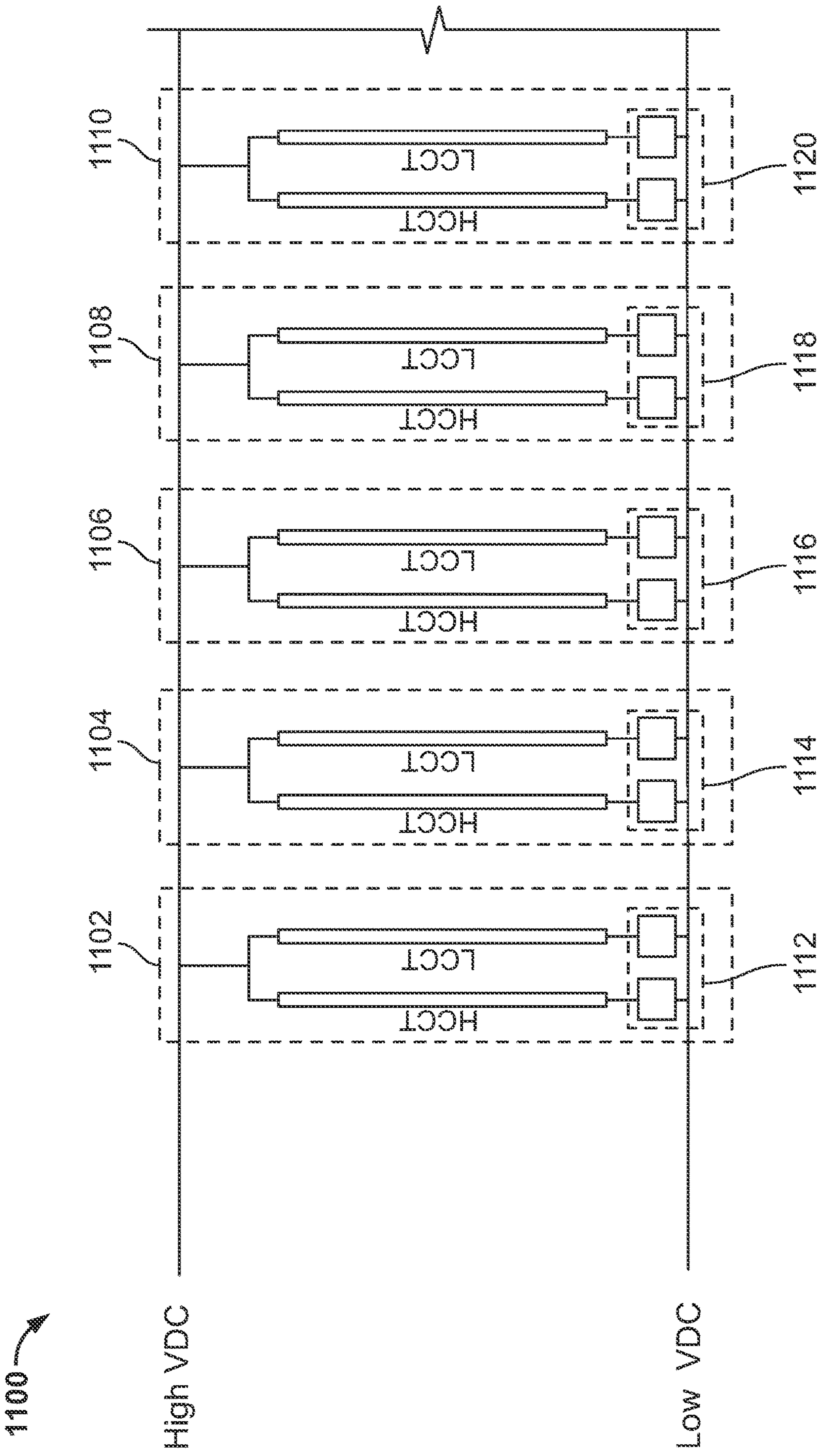
FIG. 11 shows schematically illustrative apparatus in accordance with principles of the invention.

FIG. 11 shows schematically illustrative fixture 1100. Fixture 1100 may have one or more features in common with one or more of the features of arrangement 100. Fixture 1100 may include sections 1102, 1104, 1106, 1108 and 1110. Each of the sections may be separable from the others by break-away joints. Each of the sections may include a high CCT ("HCCT") string and a low CCT ("LCCT") string. Each of the HCCT strings may have one or more features in common with string 1002. Each of the LCCT strings may have one or more features in common with string 1004. Sections 1102, 1104, 1106, 1108 and 1110 may include power modulation units 1112, 1114, 1116, 1118 and 1120, respectively. Each of the power modulation units may have one or more features in common with power supply 1006. Each of the sections may include a device control module (not shown) to control the corresponding power modulation unit. Each device control module may correspond to a device control module such as 106.

Figure 12:
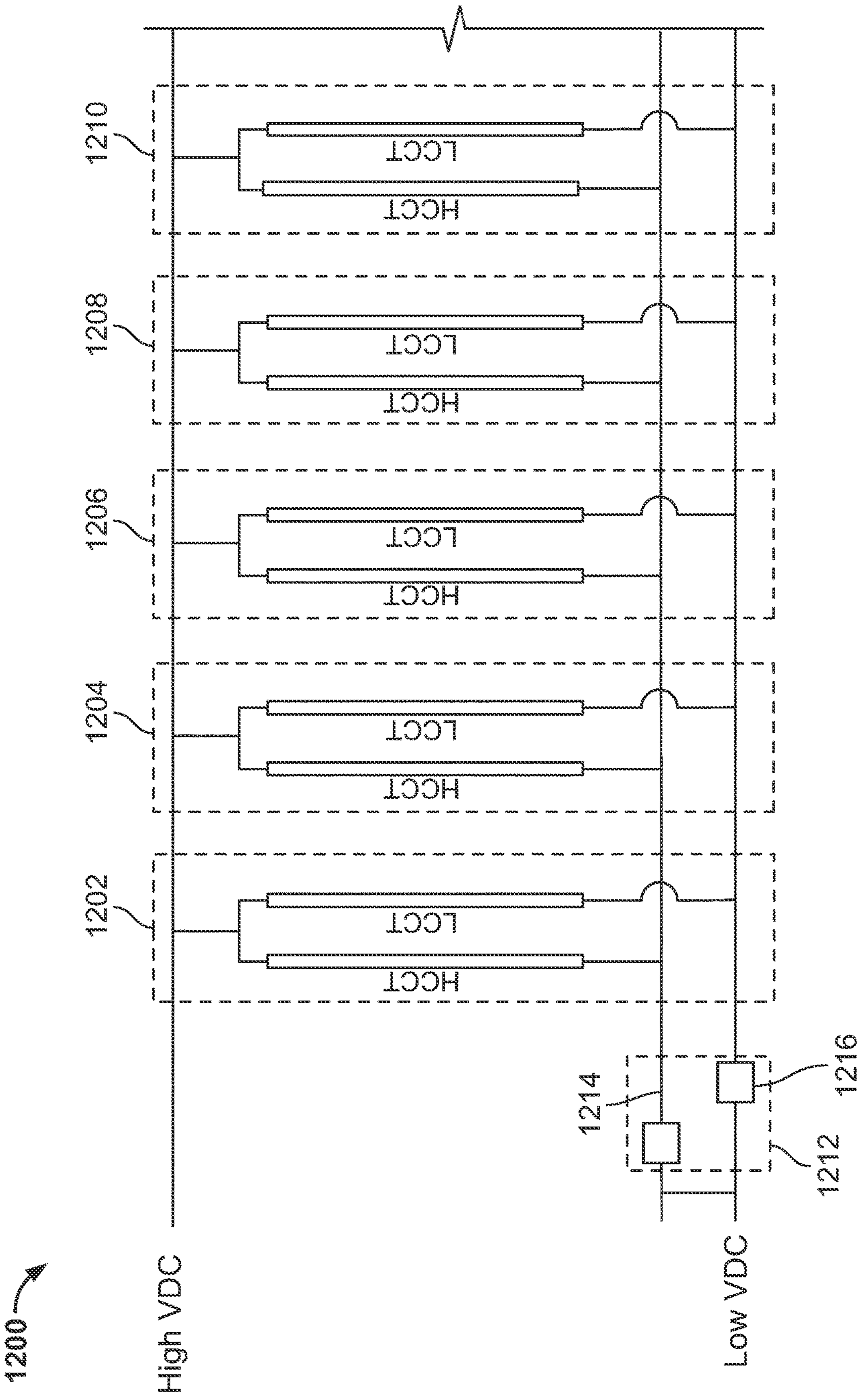
FIG. 12 shows schematically illustrative apparatus in accordance with principles of the invention.

FIG. 12 shows schematically illustrative fixture 1200. Fixture 1200 may have one or more features in common with one or more of the features of arrangement 100. Fixture 1200 may include sections 1202, 1204, 1206, 1208 and 1210. Each of the sections may be separable from the others by break-away joints. Each of the sections may include a high CCT ("HCCT") string and a low CCT ("LCCT") string. Each of the HCCT strings may have one or more features in common with string 1002. Each of the LCCT strings may have one or more features in common with string 1004. All of sections 1202, 1204, 1206, 1208 and 1210 may modulated by power supply 1212. Power supply 1212 may have one or more features in common with power supply 1006. Power supply 1212 may provide pulse-width modulation ("PWM"), via a MOSFET in line 1214, corresponding to the HCCT strings. Power supply 1212 may provide pulse-width modulation ("PWM"), via a MOSFET in line 1216, corresponding to the LCCT strings.

Fixture 1200 may include a device control module (not shown) to control power supply 1006. The device control module may correspond to a device control module such as 1008.

Figure 13:
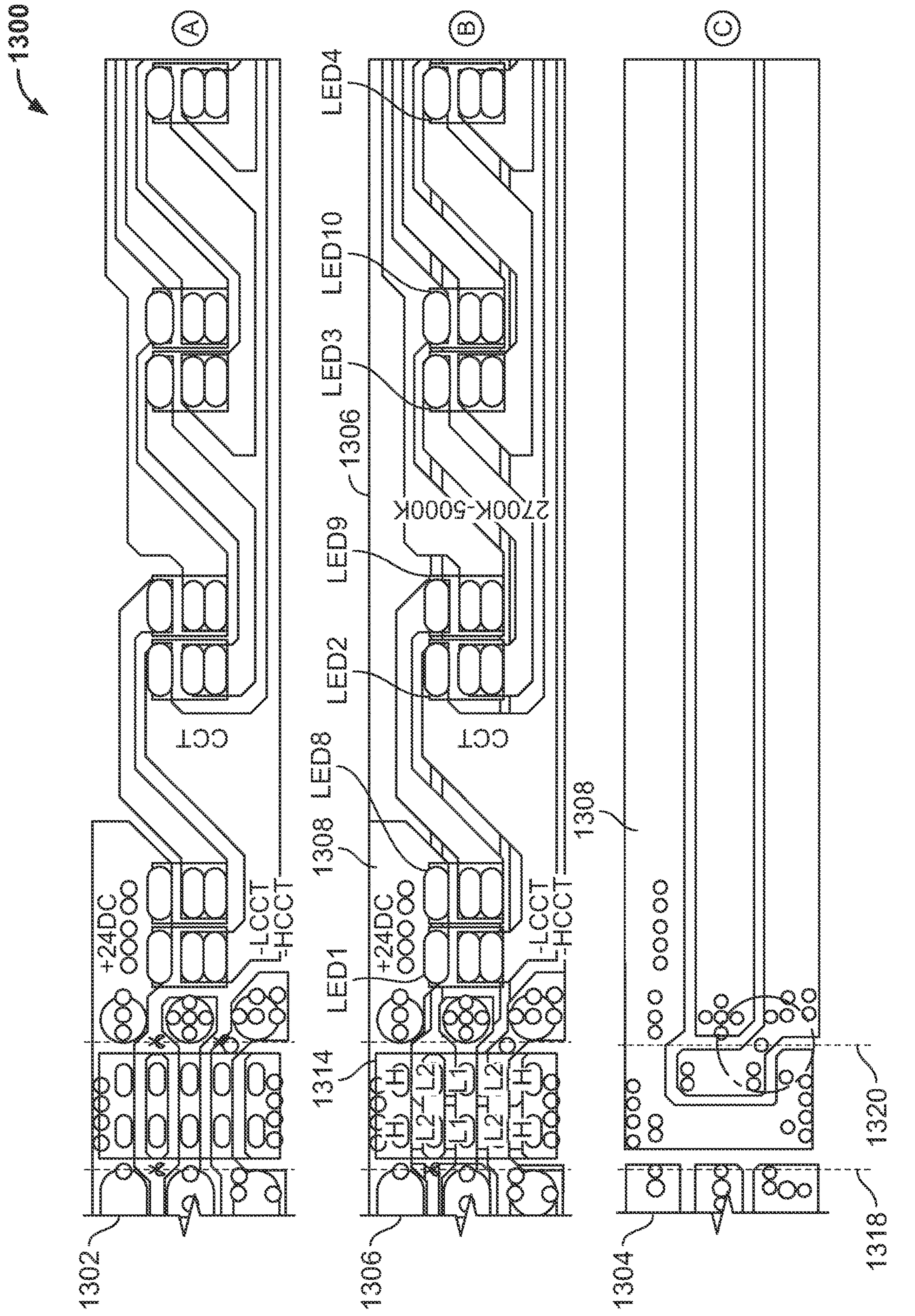
FIG. 13 shows illustrative apparatus in accordance with principles of the invention.
Figure 13:
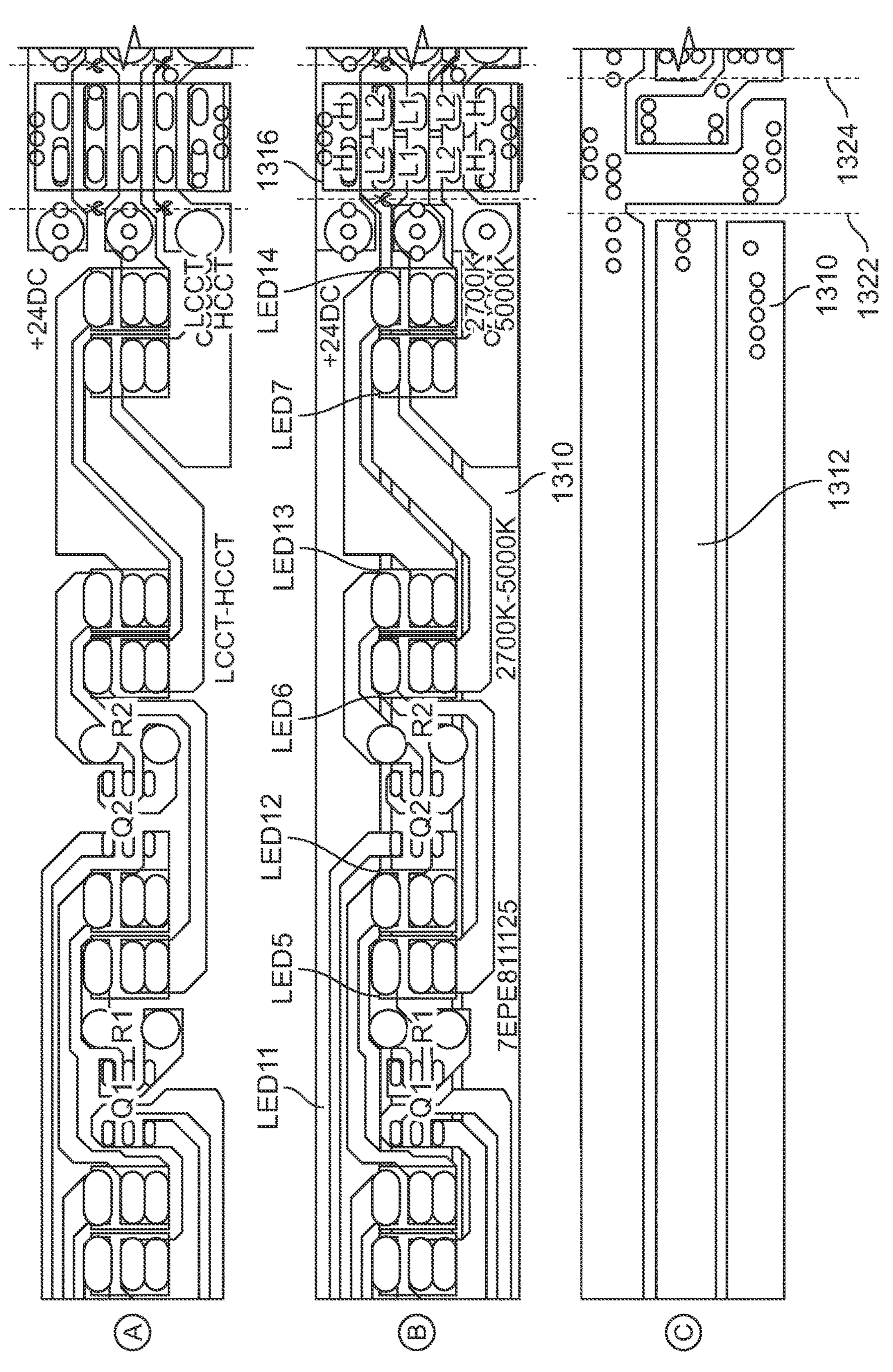

FIG. 13 shows illustrative printed circuit board composite layout 1300 for a fixture section based on high and low CCT LED strings such as 1002 and 1004. Layout 1300 may have one or more features in common with one or more of the features of arrangement 100. A top layer of layout 1300 is shown in top layer view 1302. A bottom layer of layout 1300 is shown in bottom layer view 1304. View 1306 is a combination of top layer view 1302 and bottom layer view 1304. Mounting locations for each of high CCT LEDs 1-8 are provided adjacent mounting locations for one of low CCT LEDs 10-14 in view 1306. The high CCT LEDs are in series with current regulator Q1 and resistor R1 to form the high CCT string. The low CCT LEDs are in series with current regulator Q2 and resistor R2 to form the low CCT string.

The high CCT string runs from high voltage ("H") power rail 1308 to low voltage ("L1") power rail 1310. The low CCT string runs from high voltage ("H") power rail 1308 to low voltage ("L2") power rail 1312.

Connector interfaces 1314 and 1316 include mounting locations for continuity with each of high voltage ("H") power rail 1308, low voltage ("L1") power rail 1310 and low voltage ("L2") power rail 1312.

Break-away joints 1318, 1320, 1322 and 1324 are provided. Because adjacent sections are arranged in parallel, a section that is powered via a connector may be separated from an adjacent section without loss of functionality. Multiple adjacent sections may be powered via a single connector.

Figure 14:
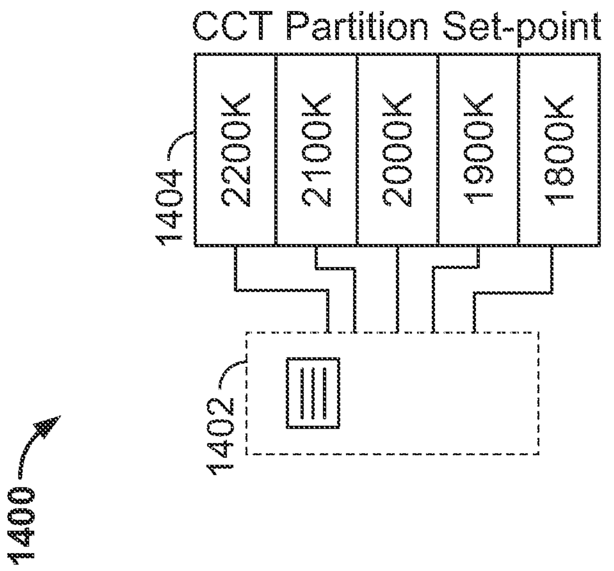
FIG. 14 shows schematically illustrative apparatus in accordance with principles of the invention.

FIG. 14 shows schematically illustrative CCT partition switch 1400. CCT partition switch 1400 may have one or more features in common with one or more features of CCT partition switch 106. CCT partition switch 1400 may include mechanical slider 1402. CCT partition switch may include indicators of different CCT partition set-points 1404. A user may move slider 1402 to select one of set-points 1404. Each of set-points 1504 may correspond to one of set-points $R_1$-$R_3$.

Figure 15:
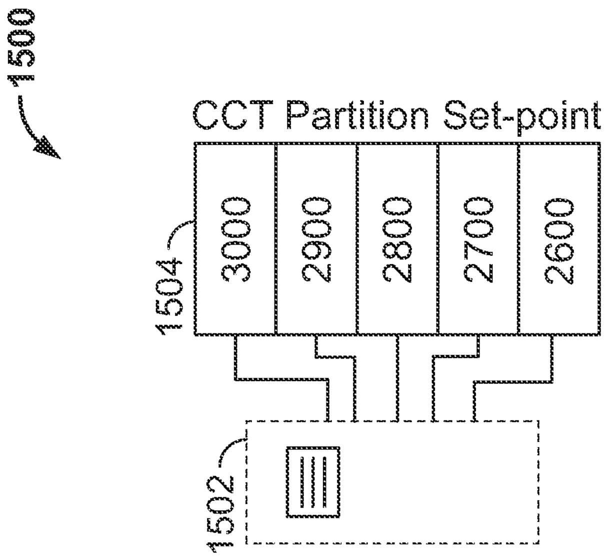
FIG. 15 shows schematically illustrative apparatus in accordance with principles of the invention.

FIG. 15 shows schematically illustrative CCT partition switch 1500. CCT partition switch 1500 may have one or more features in common with one or more features of CCT partition switch 106. CCT partition switch 1500 may include mechanical slider 1502. CCT partition switch may include indicators of different CCT partition set-points 1504. A user may move slider 1502 to select one of set-points 1504. Each of set-points 1504 may correspond to one of set-points $R_4$-$R_6$.

Figure 16:
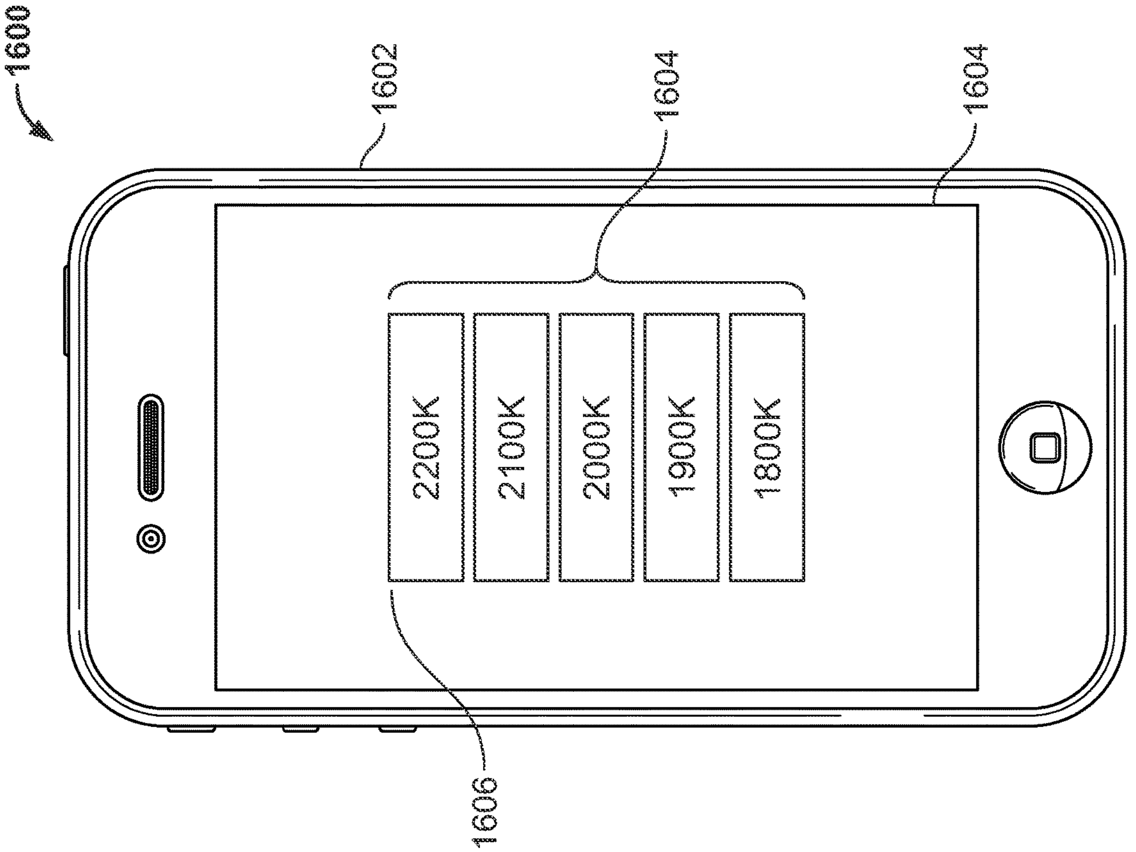
FIG. 16 shows illustrative apparatus in accordance with principles of the invention.

FIG. 16 shows an illustrative CCT partition switch 1600 implemented in software in mobile communication device 1602. CCT partition switch 1600 may have one or more features in common with one or more features of CCT partition switch 106. Mobile communication device 1602 includes touch screen 1604 showing interactive graphic user interface ("GUI") control 1606. GUI control 1606 may display partition set-points 1800, 1900, 2000, 2100 and 2200° K for selection by the user.

Figure 17:
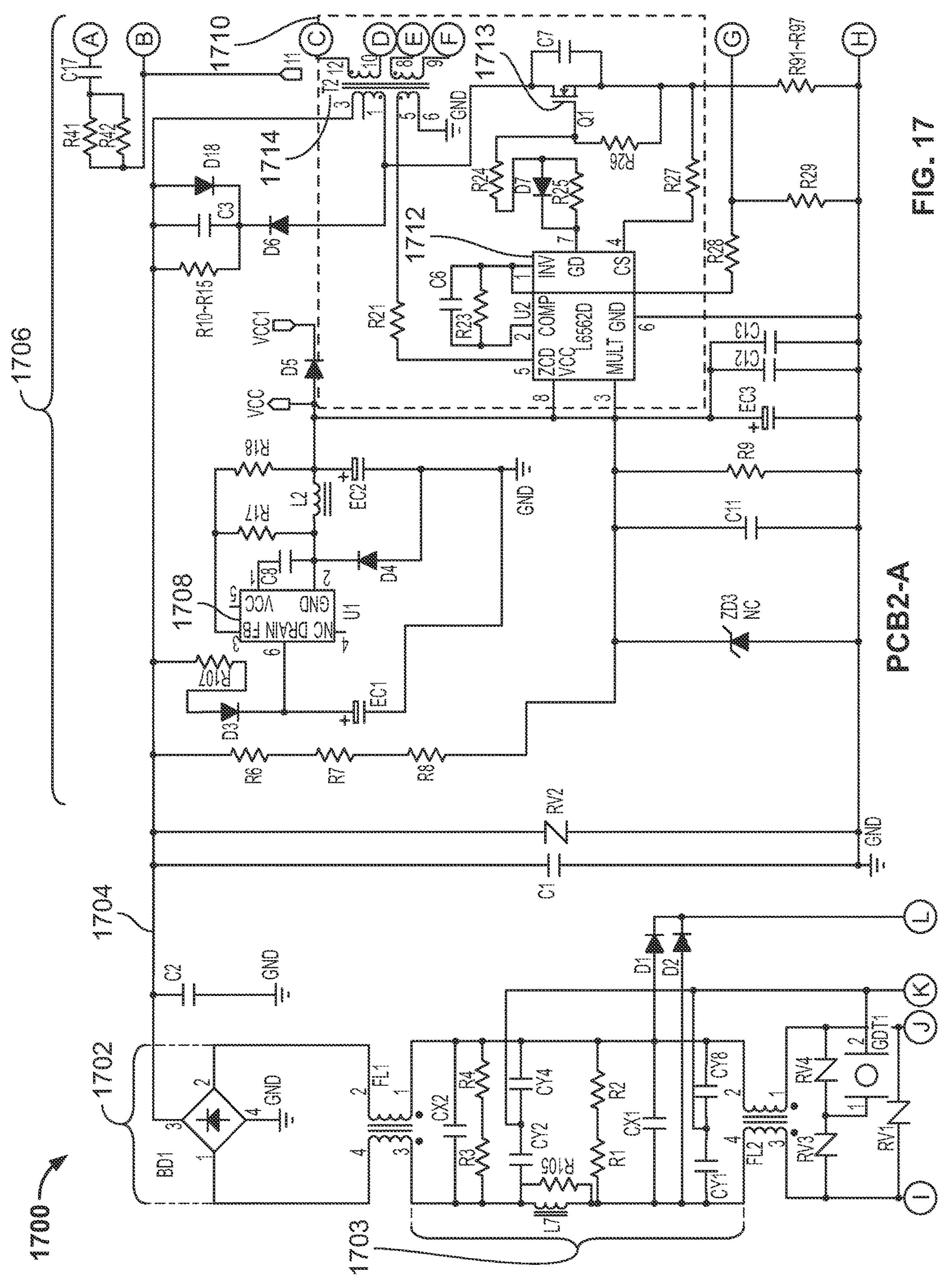
FIG. 17 shows schematically illustrative apparatus in accordance with principles of the invention.
Figure 17:
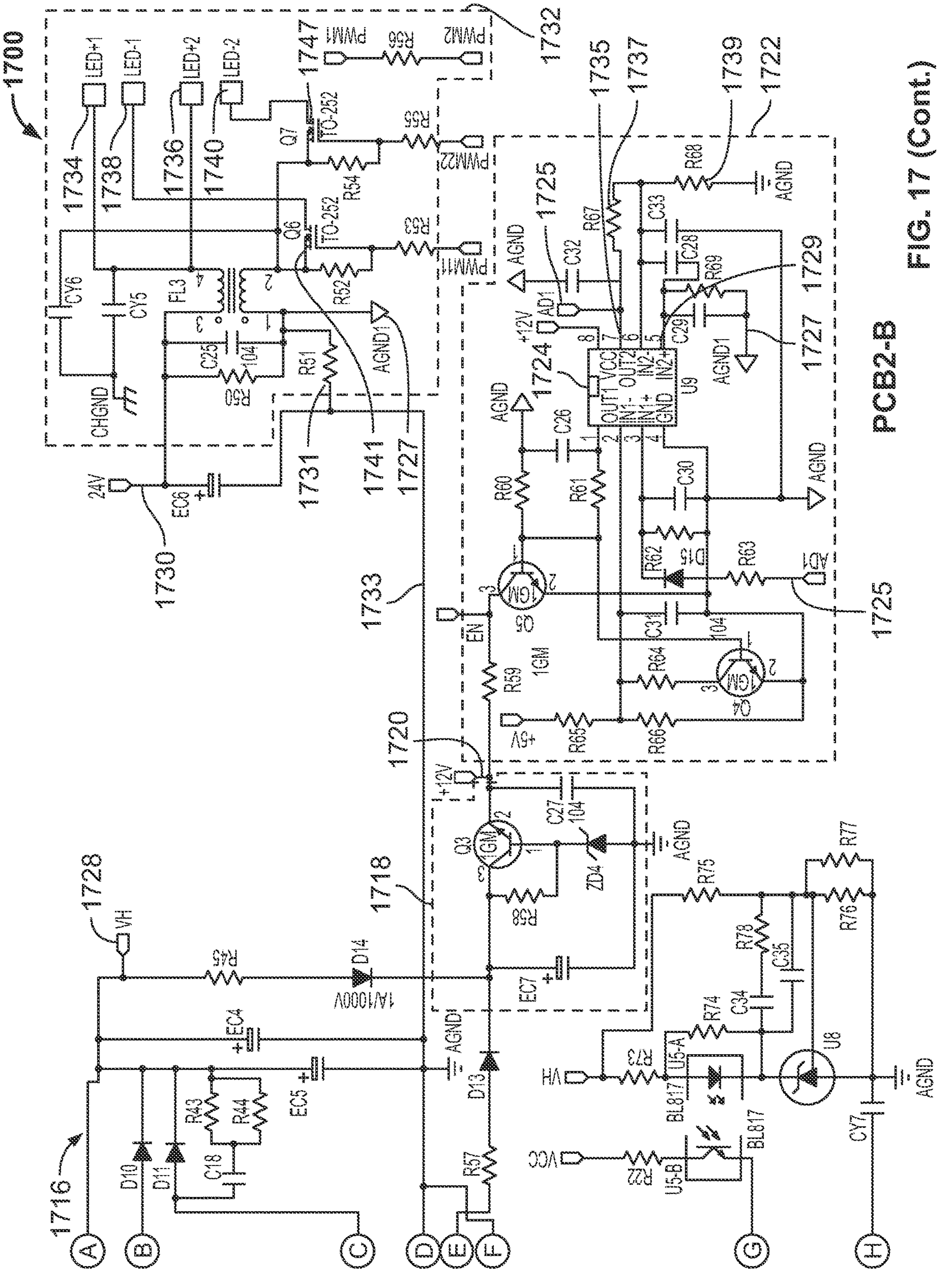
Figure 17:
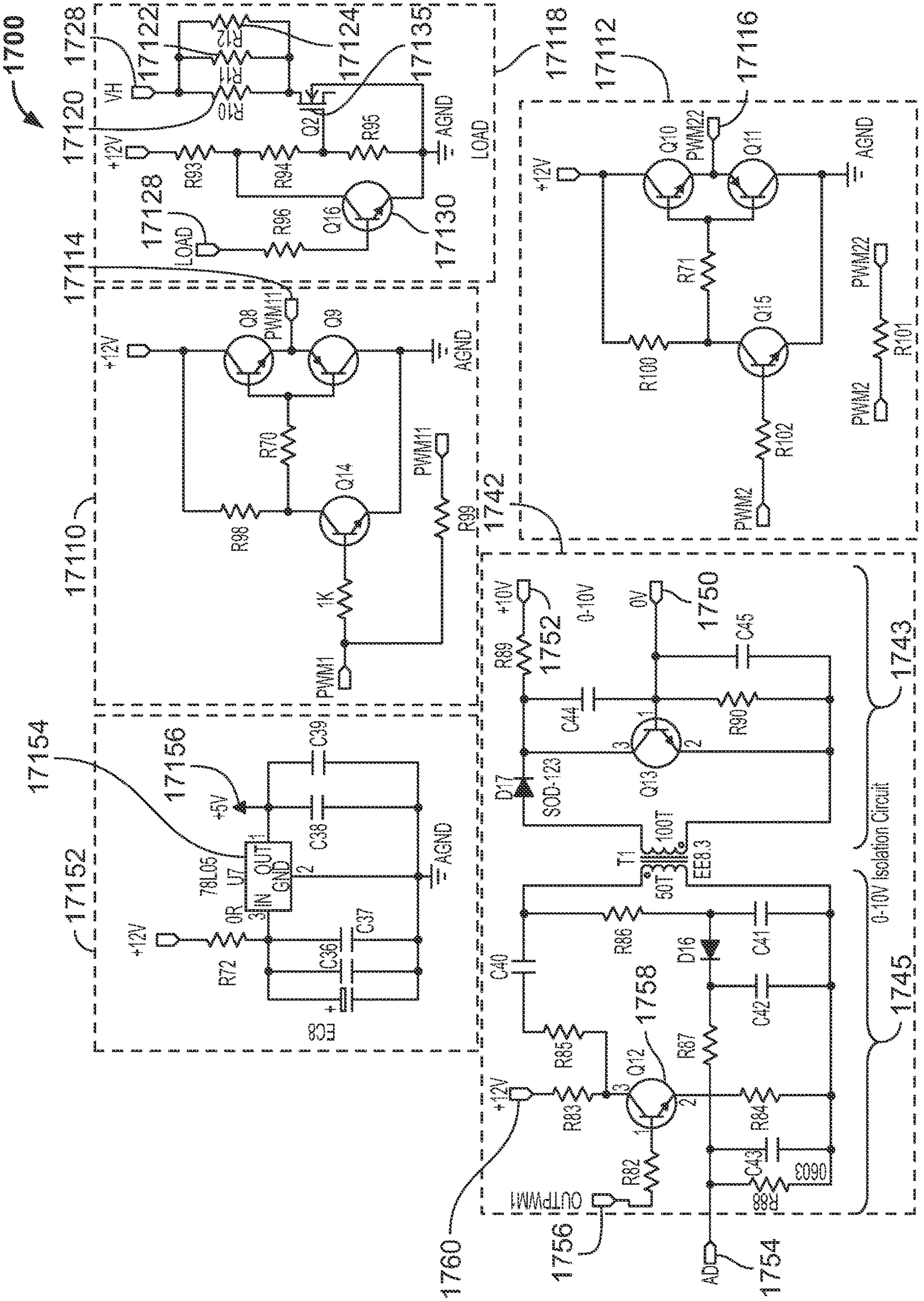
Figure 17:
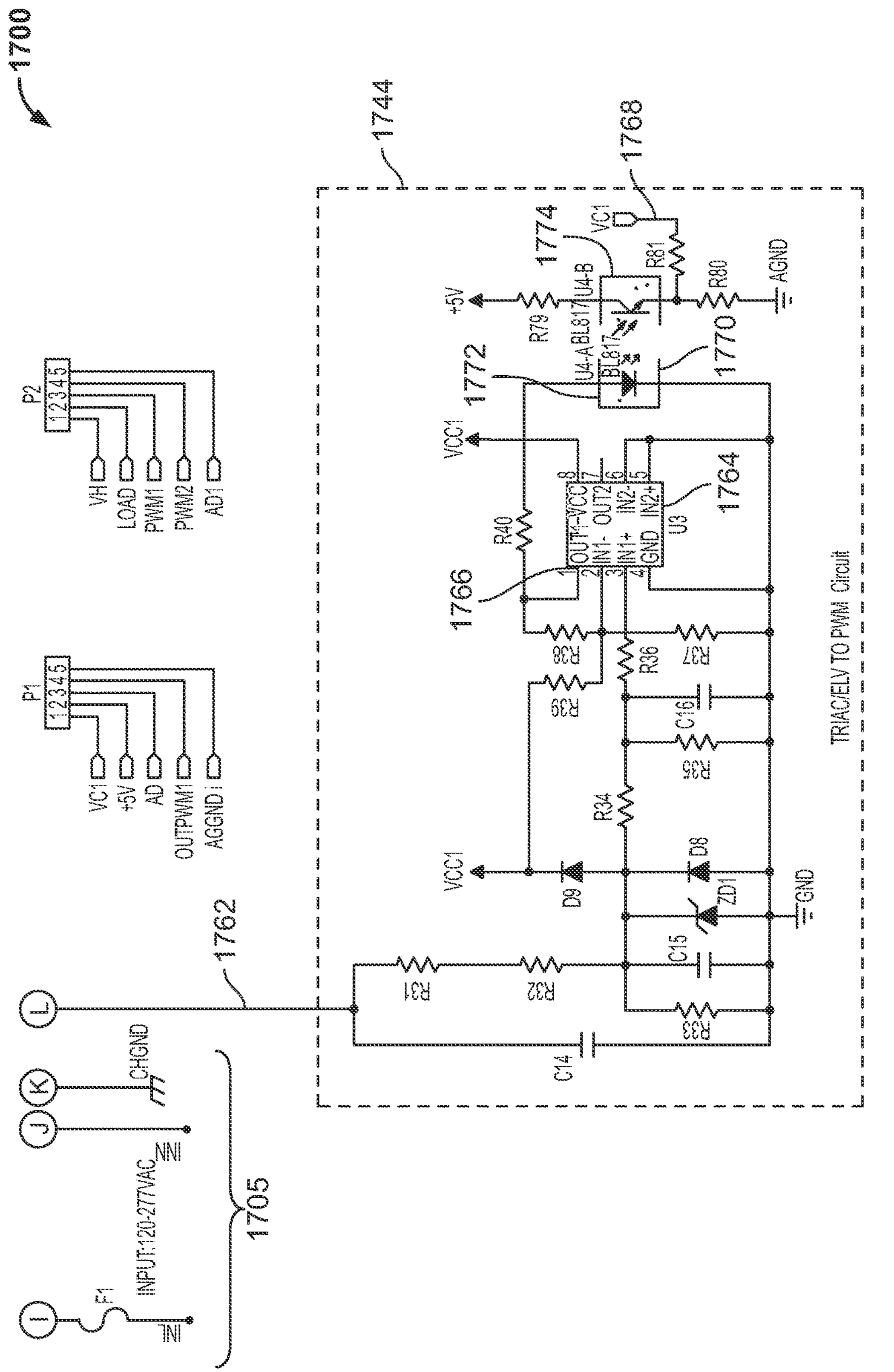
Figure 17:
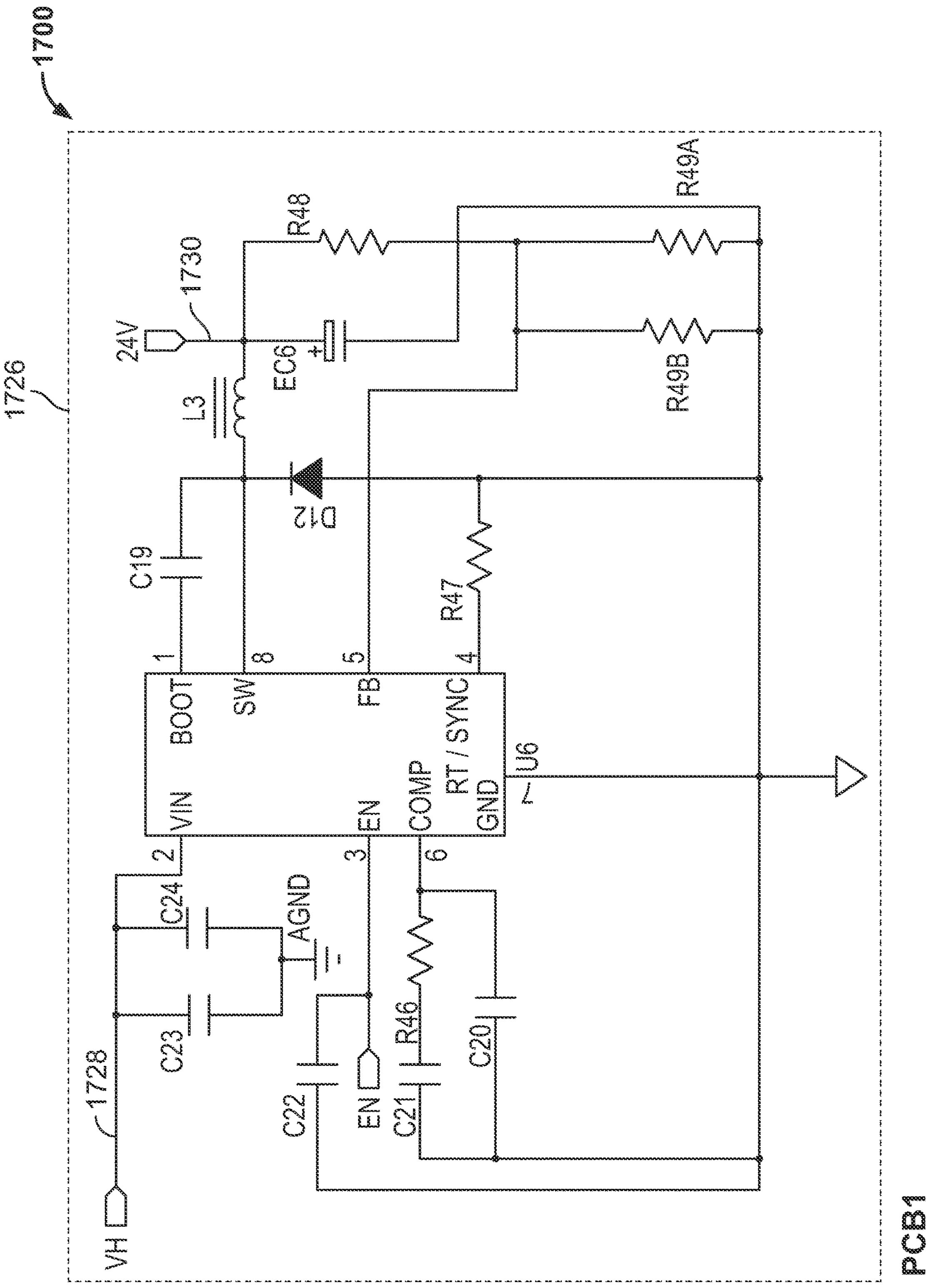
Figure 17:
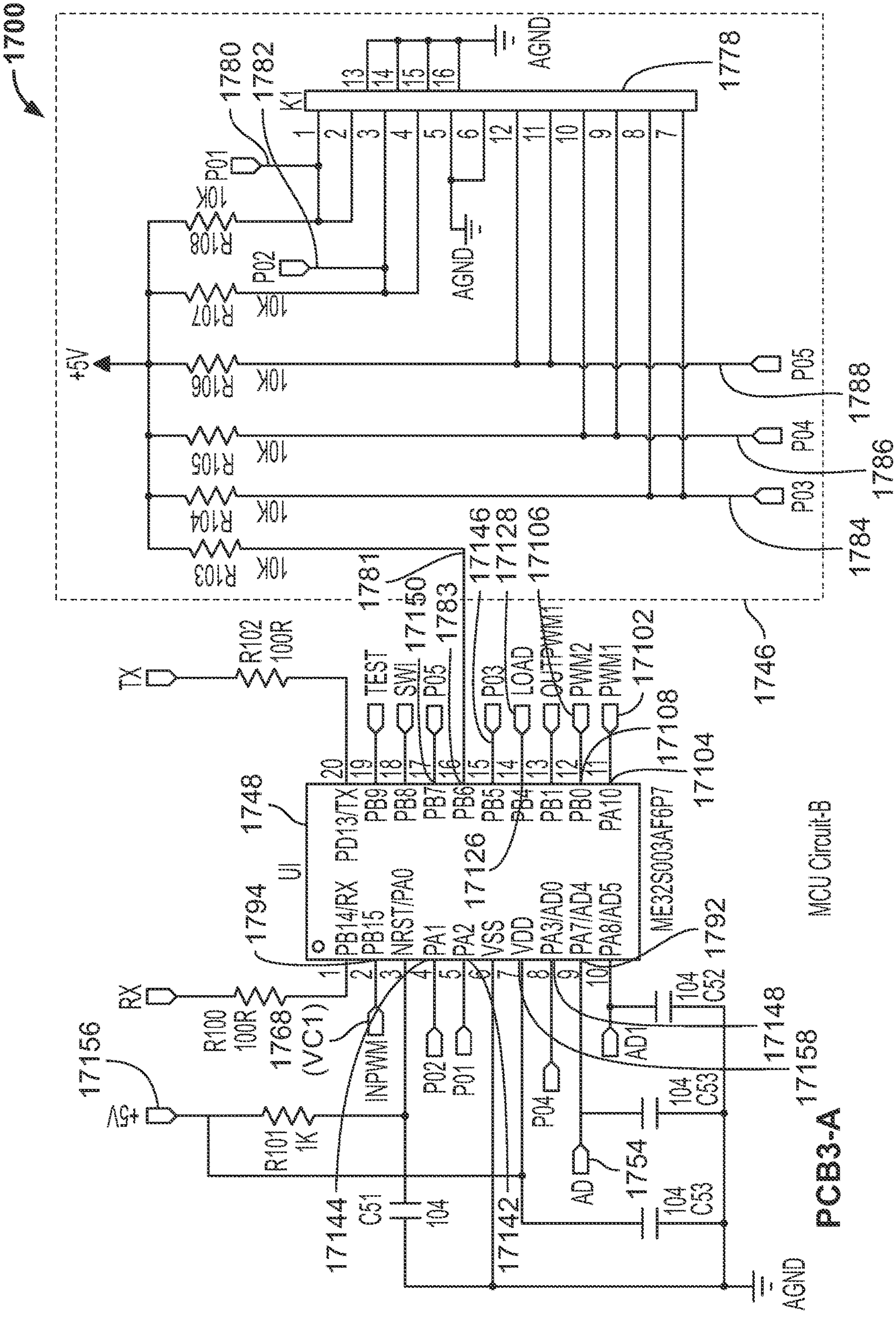
Figure 17:
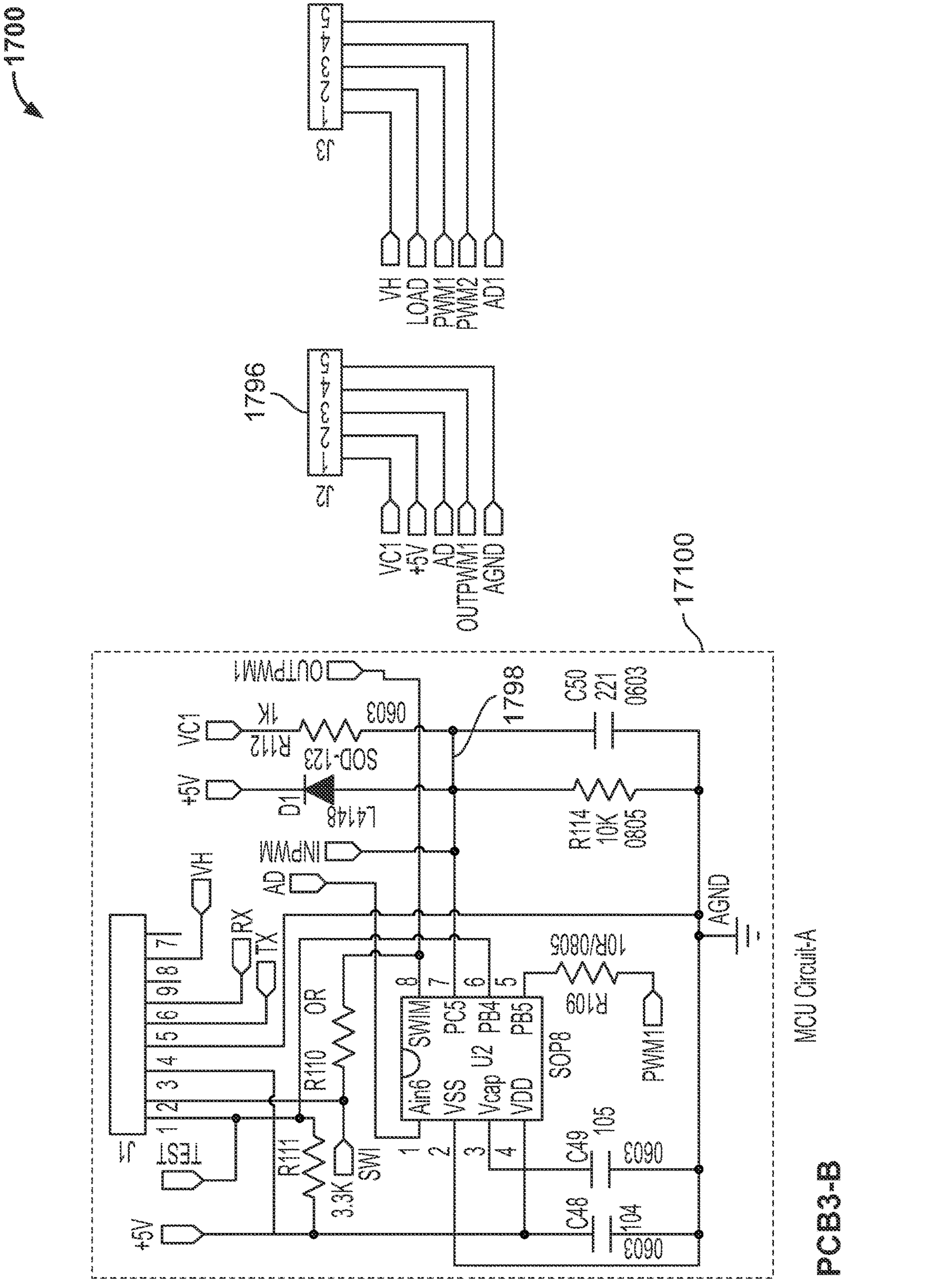

FIG. 17 shows illustrative circuit 1700. Circuit 1700 may have one or more features in common with one or more features of arrangement 100. Circuit 1700 may be implemented on one or more circuit boards ("PCB"). As illustrated in FIG. 17, circuit 1700 is implemented on three circuit boards: PCB1, PCB2 and PCB3. For the sake of illustration, PCB2 is shown on four sheets: PCB2-A, PCB2-B, PCB2-C and PCB2-D. PCB3 is shown on four sheets: PCB3-A and PCB3-B. PCB2 is described first.

Circuit 1700 may be included in power supply and controller 114 and switch 116. Circuit 1700 may include power input 1702. Power input 1702 may include electromagnetic interference filter 1703. Power input 1702 may include three-wire voltage input 1705. Power input 1702 may provide rectified current 1704 to power supply primary stage 1706 (a boost converter).

Power supply primary stage 1706 may include integrated circuit ("IC") 1708 (U1). IC 1708 may provide compensated voltage VCC based on current 1704. IC 1708 may compensate for power reductions in current 1704 resulting from dimming features of current 1704.

Primary stage 1706 may include flyback converter 1710. Flyback converter 1710 may include IC 1712 (U2). IC 1712 may open and close MOS tube 1713 (Q1). Transformer 1714 may isolate power supply primary stage 1706 from power supply secondary stage 1716. Transformer 1714 may provide power from primary stage 1706 to secondary stage 1716.

Secondary stage 1716 may include voltage regulator 1718. Voltage regulator 1718 may provide +12V source 1720.

Circuit 1700 include amplifying circuit 1722. Amplifying circuit 1722 may include IC 1724 (U9). IC 1724 (U9) may generate signal 1725 (AD1). Signal 1725 (AD1) may have a voltage that corresponds to secondary stage output current 1733. When ELV dimming is in use and the current is below a threshold current, circuit 1700 may engage a supplemental load to draw supplemental current through secondary stage 1716. IC 1724 (U9) may receive signal 1727 (AGND1) at pin 1729 (IN2+). Pin 1729 (IN2+) may be a non-inverting input to an operational amplifier in IC 1724 (U9). Signal 1727 (AGND1) may have a voltage that is generated across resistor 1731 (R51) from output current 1733. IC 1724 (U9) may generate signal 1725 (AD1) at pin 1735 (OUT2). Signal 1725 (AD1) may be amplified relative to signal 1727 (AGND1) based on the relative resistances of resistors 1737 (R67) and 1738 (R68).

For example, signal 1725 (AD1) may be used to determine when a current has reached a limit or a maximum. Resistor 1731 (R51) may be implemented as a sampling resistor having a resistance of 0.01 R. When output current 1733 is 4 A, the voltage drop through resistor 1731 (R51) may be 0.04V (and, thus, signal 1727 (AGND1) would be 0.04V). When resistor 1737 (R67) is 150K and resistor 1739 (R68) is 2K, signal 1725 (AD1) may have a voltage that is (150K/2K)×0.04V=3.04V (apx.). A threshold voltage may be set at 3.6V. The corresponding threshold current may be 4.7 A (after including a 700 mA allowance for errors in, and temperature dependences of, resistances of resistors 1731 (R51), 1737 (R67) and 1739 (R68).

Secondary stage 1716 may include buck converter 1726. Buck converter 1726 may reduce voltage 1728 (VH) to voltage 1730 (24V).

Circuit 1700 may include LED control circuit 1732. LED driver 1732 may receive voltage 1730 for providing power to LEDs at terminals 1734, 1736, 1738 and 1740. Terminals 1734 and 1736 may provide a positive voltage to each of two LED strings (not shown) such as 1002 and 1004. Terminals 1738 and 1740 may provide a negative voltage to each of the two LED strings.

LED driver 1732 may include MOSFET 1741 (Q6). LED driver 1732 may include MOSFET 1747 (Q7). MOSFETs 1741 (Q6) and 1747 (Q7) may be turned on and off to control current flow through the LED strings. MOSFET 1741 (Q6) may control current through the string having a low end coupled to terminal 1738. MOSFET 1747 (Q7) may control current through the string having a low end coupled to terminal 1740. The currents may be adjusted in response to a dimming signal transmitted from the dimmer. The currents may be adjusted in response to a CCT partition set-point signal transmitted from the dimmer.

Circuit 1700 may include dimming circuit 1742. Circuit 1700 may include dimming circuit 1744. Circuit 1700 may include switch circuit 1746. Circuit 1700 may include microcontroller ("MCU") 1748 (U1).

Dimming circuit 1742 may be configured to receive, in input section 1743, a 0-10V dimming signal across 0-10V input terminals 1750 and 1752. Terminals 1750 and 1752 may receive the 0-10V dimming signal may from dimmer switch 102. Dimming circuit 1742 may provide, in output section 1745, AD output voltage 1754. Output voltage 1754 may be proportional to the dimming signal. Dimming circuit 1742 may receive pulse width modulated ("PWM") supply signal 1756 (OUTPWM1). Supply signal 1756 may control a state of MOSFET 1758 (Q12). Energizing MOSFET 1758 may place output section 1745 in a state for converting the 0-10V dimming signal into output voltage 1754.

When there is no 0-10V dimming signal across inputs 1750 and 1752, output section 1745 may have a 12V voltage from 12V terminal 1760. Under that scenario, AD output voltage 1754 may be 4.2V.

When a 0-10V dimming signal is present across inputs 1750 and 1752, output section 1745 may have a voltage that is lower than 12V. AD output voltage 1754 may be lower than 4.2V. An AD output voltage lower than 3.7V may trigger microcontroller 1748 (U1) to enter into a 0-10V dimming program.

Dimming circuit 1744 may be configured to receive phase-based dimming signal 1762 from power input 1702. Dimming signal 1762 may be a Triac dimming signal. Dimming signal 1762 may be an ELV dimming signal. Dimming circuit 1744 may include IC 1764 (U3). IC 1764 may convert dimming signal 1762 into a PWM signal at pin 1766 (OUT1). Dimming circuit 1744 may output the PWM signal at PWM output 1768 (VC1). Dimming circuit 1744 may include optical coupler 1770. Coupler 1770 may optically isolate IC 1764 (U3) from output 1768 (VC1). Coupler 1770 may include optical transmitter 1772 (U4-A). Coupler 1770 may include optical receiver 1774 (U4-B).

Switch circuit 1746 may be part of switch such as switch 1778 (K1). Switch 1778 (K1) may be used by a user to set a CCT partition set-point. Switch 1778 (K1) may have position-based outputs such as 1780 (P01), 1782 (P02), 1784 (P03), 1786 (P04) and 1788 (P05). Switch 1778 (K1) may include a control that is positionable to short to ground each one of outputs 1780 (P01), 1782 (P02), 1784 (P03), 1786 (P04) and 1788 (P05) individually while maintaining the other outputs at a high voltage (such as 5V). The control may include a rotating member, a slider, dip-switches or any other suitable switches.

Switch circuit may include conductor 1781. Conductor 1781 may be in communication with the high voltage (5V). Conductor 1781 may be coupled to pin 1783 (PB6). MCU 1748 (U1) may detect the presence of voltage in switch circuit 1746 at pin 1783 (PB6). When MCU 1748 (U1) detects the presence of switch circuit 1746, MCU 1748 (U1) may initiate a user program. The user program may cause MCU 1748 (U1) to scan MCU 1748 (U1) pins for voltage conditions corresponding to a switch setting.

17116 (PWM22) based on signal 17106 (PWM2). PWM signal 17116 (PWM22) may have a greater amplitude than that of signal 17106 (PWM22). The amplitude of PWM signal 17116 (PWM22) may be sufficient to properly control MOSFET 1747 (Q7) to throttle current from terminal 1740 from the negative end of the second LED string.

MCU (U1) 1748 may achieve a partition such as P (shown in FIGS. 2 and 3) of power between high CCT LEDs in a first string and low CCT LEDs in a second string by modulating signals 17102 (PWM1) and 17106 (PWM2) such that each generates a current through its corresponding LED string that, relative to the total current through the strings, corresponds to the desired partition between the strings. Each of the selectable CCT partition set-points corresponds to a different partition. Table 4 shows illustrative CCT partition set-points, corresponding switch signal values and corresponding MCU (U1) 1748 outputs.

TABLE 4

Illustrative CCT partition set-points, corresponding switch output values and corresponding MCU (U1) 1748 outputs.

| Illustrative CCT partition set-point | Illustrative switch output values (V) | | | | | Illustrative CCT partitioning (P) based on percentage of lighting power delivered to MCU (U1) 1748 outputs | |
|---|---|---|---|---|---|---|---|
| | | | | | | PWM1 (4 KHz sq. wave) | PWM2 (4 KHz sq. wave) |
| CCT | P02(PA1) | P01(PA2) | P04(PA3) | P03(PB5) | P05(PB7) | (PA10) | (PB0) |
| 2700° K | 0 | 5 | 5 | 5 | 5 | 100% | 0 |
| 3000° K | 5 | 0 | 5 | 5 | 5 | 79% | 21% |
| 3500° K | 5 | 5 | 0 | 5 | 5 | 58% | 42% |
| 4000° K | 5 | 5 | 5 | 0 | 5 | 39% | 61% |
| 5000° K | 5 | 5 | 5 | 5 | 0 | 0% | 100% |

MCU 1748 (U1) may detect, at pins 17142 (PA2), 17144 (PA1), 17146 (PB5), 17148 (PA3/AD0), 17150 (PB7), switch settings from outputs 1780 (P01), 1782 (P02), 1784 (P03), 1786 (P04) and 1788 (P05), respectively.

MCU 1748 (U1) may detect 0-10V AD output voltage 1754 at pin 1792 (PA7/AD4).

MCU 1748 (U1) may detect Triac/ELV PWM output 1768 (VC1) at pin 1794 (PB15). Output 1768 (VC1) may be coupled to jumper 1796 (J2, VC1). From jumper 1796, output 1768 (VC1) may be fed via path 1798 of IC U2 circuit 17100 to pin 1794 (PB15). One or more features of circuit 17100 may be unused.

MCU 1748 (U1) may output signal 17102 (PWM1) at pin 17104 (PA10). MCU 1748 (U1) may output signal 17106 (PWM2) at pin 17108 (PB0). Signals 17102 (PWM1) and 17106 (PWM2) may be based on one or more of AD output voltage 1754, PWM output 1768 (VC1) conductor 1781 and any other suitable input to MCU 1748 (U1).

MCU 1748 (U1) may output signal 17102 (PWM1) to amplifier 17110. Amplifier 17110 may generate PWM signal 17114 (PWM11) based on signal 17102 (PWM1). PWM signal 17114 (PWM11) may have a greater amplitude than that of signal 17102 (PWM1). The amplitude of PWM signal 17114 (PWM11) may be sufficient to properly control MOSFET 1741 (Q6) to throttle current from terminal 1738 from the negative end of the first LED string.

MCU 1748 (U1) may output signal 17106 (PWM2) to amplifier 17112. Amplifier 17112 may generate PWM signal Circuit 1700 may include supplemental load 17118. Supplemental load 17118 may be in parallel with LED control circuit 1732 between voltage 1728 (VH) and GND.

Supplemental load 17118 may include one or more of resistors 17120 (R10), 17122 (R11) and 17124 (R12). Supplemental load 17118 may draw current from power supply secondary stage 1716 when circuit 1700 operates with ELV dimming via dimming circuit 1744. At high dimming (low brightness) levels, supplemental load 17118 may be turned ON to maintain a sufficient maintenance current in the ELV dimmer.

MCU 1748 (U1) may execute a dimming mode program. The program may include modules. A first module may be a non-dimming module. A second module may be an ELV dimming module. A third module may be a 0-10V dimming module.

If MCU 1748 (U1) does not detect a dimmer, MCU 1748 (U1) may operate one or both of the LED strings at a high brightness.

If MCU 1748 (U1) detects an ELV dimmer, MCU 1748 (U1) may operate one or both of the LED strings using ELV dimming.

If MCU 1748 (U1) detects a 0-10V dimmer, MCU 1748 (U1) may operate one or both of the LED strings using 0-10V dimming.

If MCU 1748 (U1) detects no dimmer or a 0-10V dimmer, MCU 1748 (U1) may set signal 17128 (LOAD) (at pin 17126 (PB4) to high (5V). This may turn MOSFET 17130 (Q16) ON, which may in turn reduce a gate voltage of MOS tube 17135 to switch off current through resistors 17120 (R10), 17122 (R11) and 17124 (R12).

If MCU 1748 (U1) operates using ELV dimming, MCU 1748 (U1) may activate supplemental load 17118 based on the strength of secondary stage output current 1733, as detected via signal 1725 (AD1) in amplifying circuit 1722. If the voltage of signal 1725 (AD1) is lower than 0.76V (e.g., output current 1733 is 1 A, signal 1725 (AD1) is 0.01*76=0.76V), MCU 1748 (U1) may set signal 17128 (LOAD) (at pin 17126 (PB4) to low (0V). This may turn MOSFET 17130 (Q16) OFF, which may in turn increase a gate voltage of MOS tube 17132 to switch on current through resistors 17120 (R10), 17122 (R11) and 17124 (R12). This may maintain the sufficiency of current through the ELV dimmer.

MCU 1748 (U1) may monitor signal 1725 (AD1).

Circuit 1700 may include stepdown voltage regulator circuit 17152. Regulator 17152 may include IC 17154 (U1). Regular circuit 17152 may produce voltage 17156 (+5V). Voltage 17156 may provide power to MCU 1748 (U1) at pin 17158 (VDD) of MCU 1748 (U1).

Table 5 lists illustrative parts that may be associated with PCB-1.

TABLE 5

Illustrative parts that may be associated with PCB-1.

| Part description | Tag |
|---|---|
| SMD IC RT6365GSP ESOP8 Reel RoHS | U6 |
| X7R CHIP Capacitor 1 uF/50 V, ±10%, 125° C. (1206) | C19 |
| NPO chip capacitor 470 pF/50 V, ±5%, 125° C. (0805) | C20 |
| X7R Chip Capacitor 6.8 nF/50 V, ±10%, 125° C. (0805) | C21 |
| Chip capacitance_2.2 uF/50 V_±10%_1206 | C23, C24 |
| SMD Schottky diode SS56 5 A/60 V SMC | D12 |
| 1/8 W Chip Resistor, 15K ± 5% (0805) | R46 |
| 1/8 W Chip Resistor, 510K ± 1% (0805) | R47 |
| 1/8 W Chip Resistor, 120K ± 1% (0805) | R48 |
| 1/10 W Chip Resistor, 4.3K ± 1% (0603) | R49A |
| 1/10 W chip resistor _130K ± 1% (0603) | R49B |
| PS24DC288W copper heat sink | PCB board back |
| Double sided PCB FR4 51.9 * 23.8 * 1.2 mm 4 * 4 continuous RoHS | |
| Any other suitable part | |

Table 6 lists illustrative parts that may be associated with PCB-2.

TABLE 6

Illustrative parts that may be associated with PCB2.

| Part description | Tag |
|---|---|
| Slow breaking square fuse 3.15 A300 V 8.5 * 8 * 4.5 12.8 hole pitch taping | F1 |
| Varistors Φ10 mm 510 V ± 10% 8.5 P Belt Mounted High Surge | RV1, RV2, RV3, RV4 |
| X2 safety capacitor 0.47 uF/305 V ± 10% P = 15 | CX2 |
| Common mode inductor T16 × 12 × 8 25 mH | FL1 |
| Common mode inductor T13 × 8 × 6.5 1.9 mH | FL2 |
| Common Mode Inductor T13 * 8 * 5 18 uH ± 20% | FL3 |
| Y1 amp capacitor 2.2 nF/400 V ± 20% P = 10 | CY7 |
| Plug-in rectifier bridge 10 A 1000 V GBU1010 GUB | BD1 |
| Plug-in rectifier bridge 10 A 1000 V GBU1010 GUB | C1 |
| 0.6 mm Jumper Length 6.5 mm Bend length 4 mm | L1 |
| Plug-in color ring inductor CKL0514/8.2 mH/J-CCA | L2 |
| Filter inductor T16 * 8.5 * 5.9 50 uH ± 10% | L3 |
| Electrolytic capacitor 10 uF/500 V ± 20%_105° C._Φ10 * 20 | EC1 |
| Electrolytic capacitor 47 uF/50 V ± 20% 105° C. Φ6.5 * 11.5 taping | EC2 |
| Electrolytic capacitor 1000 uF ± 20% 50 V 130° C. Φ13 * 25 mm | EC4, EC5 |
| Electrolytic capacitor 470 uF/35V ± 20% 105° C. Φ10 * 20 taping | EC6 |
| Ultra-fast recovery diode 20 A 400 V SF2006FCT ITO-220AB | D10, D11 |
| Plugin N- MOSFET 20 A 800 V 20N80MFS TO-220MF | Q1 |
| Plug-in N-MOS tube 80 A 80 V CS80N07 A8 TO-220 | Q7, Q6 |
| Output transformer PQ3220 9:8:8:17:8:5:9 0.2 mH | T2 |
| Transformer EE8.3 100:50 26 mH ± 30% | T1 |
| 18# white Teflon thread length 220, half peeled 13/dip tin 3 | N |
| 18# black Teflon thread length 220, half peeled 13/dip 3 | L |
| 18# green Teflon line length 180, half peeled 10/dip 3 | GND |
| 22# pink Teflon wire length 320 tin impregnation 10 impregnated tin 3 | 0V |
| 22# Purple Teflon Wire Length 320 Tin Impregnation 10 Tin Impregnation 3 | 10V |
| 16# Red Teflon Line Length 150 One End Dip 10 One End Dip 2.5 | LED + 1 |
| 16# black Teflon wire length 150 one end dip 10 one end dip 2.5 | 2LED− |
| 16# blue Teflon wire length 150 one end dip 10 one end dip 2.5 | 1LED− |
| φ5.0 round head cross screw 1/8"-40 tooth length 6 nickel plated | Lock aluminum heat sink |
| Yellow Myra width 30 mm flame retardant temperature resistance 130° C. UL certification | Pack the heatsink |
| PS24DC aluminum small heat sink | |
| PS24DC aluminum large heat sink | |
| Yellow Myra width 30 mm flame retardant temperature resistance 130° C. UL certification | |
| PS24DC copper large heat sink | |
| Thermal double-sided adhesive 50 * 19 Thermal conductivity 1.5 W/M · K | |
| Y2 amp capacitor 4.8 nF/250 V, ±20%, P = 8.5 12.8 aperture spacing taping | CY5, CY6 |
| Inductor 13 * 8 * 5 220 uH ± 20% T50-26 | L7 |
| Magnetic beads, RH3.5 * 3 * 1.5 nickel zinc | For CY1, CY2, CY4, CY8, CY5, CY6 |
| Y2 amp capacitor 2.2 nF/250 V, ±20%, P = 8.5 12.8 hole pitch taping | CY1, CY2, CY4, CY8 |
| Electrolytic capacitor 22 uF ± 20% 63 V 105° C. Φ5 * 11 mm 5000 H | EC7 |

TABLE 6-continued

Illustrative parts that may be associated with PCB2.

| Part description | Tag |
|---|---|
| Metal film resistor, 1 W, 150Ω ± 5% with mounting | R107 |
| Blue Myra width 15 mm flame retardant temperature resistance 130° C. | |
| Black heat shrinkable tube Φ17 × 50, temperature resistance 125° C., UL certification | Isolate inductor L1 with heat sink |
| Discharge tube 2RH3000L-8 3KV IB | GDT1 |
| Black heat shrinkable tube inner diameter Φ10 × 15 mm, temperature resistance 125° C., UL certification | Set on the GDT1 |
| X2 safety capacitor 0.22 uF/305 V ± 10% P = 15 | CX3 |
| 1/10 W Chip Resistor, 10 R ± 1% (0603) | R53, R55 |
| 1/10 W Chip Resistor, 10K ± 5% (0603) | R59, R60, R61, R63, R52 |
| 1/10 W Chip Resistor, 2K ± 1% (0603) | R64, R68 |
| 1/10 W Chip Resistor, 5.1K ± 1% (0603) | R65 |
| 1/10 W Chip Resistor, 20K ± 5% (0603) | R66 |
| 1/10 W_ chip resistor _150K ± 1% (0603) | R67 |
| 1/10 W Chip Resistor, 1K ± 1% (0603) | R69, R86, R89, R19, R20 |
| 1/10 W Chip Resistor, 100K ± 5% (0603) | R88 |
| 1/10 W Chip Resistor, 100 R ± 1% (0603) | R84 |
| 1/10 W CHIP Resistor_4.8K ± 1% (0603) | R90, R41 |
| 1/8 W Chip Resistor, 0 R ± 5% (0805) | R8, R36, R72 |
| 1/8 W Chip Resistor, 4.8K ± 1% (0805) | R17, R80 |
| 1/8 W Chip Resistor, 180K ± 1% (0805) | R33, R35 |
| 1/8 W Chip Resistor, 20K ± 1% (0805) | R87 |
| 1/8 W Chip Resistor, 68K ± 1% (0805) | R21 |
| 1/8 W Chip Resistor, 30Ω ± 1% (0805) | R25 |
| 1/8 W Chip Resistor, 47KΩ ± 1% (0805) | R23 |
| 1/8 W Chip Resistor, 10K ± 1% (0805) | R26, R34, R54 |
| 1/8 W Chip Resistor, 1K ± 1% (0805) | R27, R81, R82, R30 |
| 1/8 W Chip Resistor, 27K ± 5% (0805) | R28 |
| 1/8 W Chip Resistor, 2.2K ± 1% (0805) | R29 |
| 1/8 W Chip Resistor, 3K ± 1% (0805) | R37, R40, R83 |
| 1/8 W Chip Resistor, 100K ± 1% (0805) | R39 |
| 1/8 W Chip Resistor, 1M ± 1% (0805) | R62 |
| 1/8 W Chip Resistor, 100Ω ± 1% (0805) | R79, R85 |
| 1/4 W chip resistor _510K ± 1% (1206) | R1, R2, R3, R4, R6, R7 |
| 1/4 W Chip Resistor, 4.8K ± 1% (1206) | R106 |
| 1/8 W Chip Resistor, 39K ± 1% (0805) | R18 |
| 1/4 W chip resistor _360K ± 1% (1206) | R32, R31 |
| 1/4 W Chip Resistor, 510 R ± 1% (1206) | R45 |
| 1/4 W Chip Resistor, 22K ± 5% (1206) | R50 |
| 1/4 W Chip Resistor, 10K ± 5% (1206) | R58 |
| 1/4 W Chip Resistor, 10K ± 1% (1206) | R73 |
| 3/4 W Chip Precision Resistor 10 mR ± 1% (2010) | R51 |
| X7R CHIP Capacitor 100 nF/50 V, ±10%, 125° C. (0603) | C26, C31, C32, C42, C43, C44 |
| X7R CHIP Capacitor 1 uF/50 V, ±10%, 125° C. (0603) | C29, C30 |
| NPO chip capacitor 100 pF/50 V_± 5%_125° C. (0603) | C33, C41 |
| X7R Chip Capacitor 470 nF/50V, ±10%, 125° C. (0603) | C45 |
| X7R CHIP Capacitor 1 uF/50 V, ±10%, 125° C. (0805) | C8, C36, C37, C38, C39, C40, C34A, C3 |
| X7R CHIP Capacitor 1 nF/50 V, ±10%, 125° C. (0805) | C11, C16 |
| X7R CHIP Capacitor 100 nF/50 V, ±10%, 125° C. (0805) | C19, C13, C27 |
| X7R CHIP Capacitor 100 pF/1 KV, ±10%, 125° C. (1206) | C7, C17, C18 |
| Chip rectifier diode, 1 A/1000 V, SOD-123 | D1, D2, D3, D14 |
| Ultra-fast recovery diode ES1JW 1 A/600 V SOD-123FL | D4 |
| Chip switch diode, 1N4148W, 0.15 A/85 V, SOD-123 | D5, D7, D8, D15, D16, D17 |
| Chip rectifier diode, S2M, 2 A/1000 V, DO-214AA | D6 |
| Chip regulator diode 6.2 V/0.5 W SOD-123 | ZD1 |
| Chip regulator diode 12 V ± 2%/MM1ZB12 0.5 W SOD-123 | ZD4, ZD6 |
| Chip regulator diode 33 V/0.5 W SOD-123 | ZD5 |
| CHIP Transistor MMBTA06, 1 GM(SOT-23) | Q4, Q5, Q12, Q13,Q2 |
| Chip NPN transistor 2SD1760U_SOT-89_60 V/3 A | Q3 |
| SMD IC BP8519C SOT23-5 Reel RoHS | U1 |
| Chip Power IC, ST, L6562DTR, SO-8, Reel, RoHS | U2 |
| SMD Op Amp IC LM258(SO-8) | U3,U9 |
| SMD optocoupler BL817S-C, 4-pin, Galaxy | U4, U5 |
| SMD IC, BL78L05, SOT-89 | U7 |
| X7R chip capacitor 470 nF/50 V, ±10%, 125° C. (0805) | C6 |
| X7R CHIP Capacitor 2.2 nF/1 KV, ±10%, 125° C. (1206) | C9, C10 |
| 1/8 W Chip Resistor, 5.6K ± 1% (0805) | R9 |
| 1/4 W Chip Resistor, 390K ± 1% (1206) | R10, R11, R12, R13, R14, R15 |
| Double sided PCB FR4 178.0 * 52.5 * 1.6 mm 1 * 3 continuous 2OZ RoHS | |
| 1/10 W Chip Resistor, 300 R ± 1% (0603) | R99, R101 |
| 1/4 W Chip Resistor, 100 R ± 1% (1206) | R41A, R41B, R42A, R42B |
| SMD TVS Tube 250 V SMCJ250A DO-214AB (SMC) | D18 |
| 1/8 W Chip Resistor, 10 R ± 1% (0805) | R22, R24 |
| 3/4 W chip resistor 5.1K ± 1% (2010) | R43, R44, R16 |
| 1/4 W Chip Resistance, 1.5 R ± 1% (1206) | R49, R91, R92, R93 |
| 1/4 W Chip resistance 1.2 R ± 1% (1206) | R94, R95, R96, R97 |

TABLE 6-continued

| Illustrative parts that may be associated with PCB2. | |
|---|---|
| Part description | Tag |
| SMD N-MOS tube _3 A/60 V_UT3N06G-AB3-R_SOT-89 | Q16 |
| Chip regulator diode 5.1 V/0.5 W SOD-123 | D12 |
| Any other suitable part | |

Table 7 lists illustrative parts that may be associated with PCB-3.

TABLE 7

| Illustrative parts that may be associated with PCB-3. | |
|---|---|
| Part description | Tag |
| SMD IC ME32S003AF6P7 SS0P-20 Reel RoHS | U1 |
| X7R Chip Capacitor 100 nF/50 V, ±10%, 125° C. (0603) | C48, C51, C52, C53, C54 |
| X7R Chip Capacitor 150 PF/50 V, ±10%, 125° C. (0603) | C50 |
| 1/10 W Chip Resistor, 100 R ± 1% (0603) | R100, R102 |
| 1/10 W Chip Resistor, 1K ± 1% (0603) | R101, R112 |
| 1/10 W Chip Resistor, 10K ± 5% (0603) | R103, R104, R105, R106, R107, R108 |
| 1/10 W Chip Resistor, 0 R ± 5% (0603) | R113 |
| Double sided PCB FR4 22 * 37.1 * 1.0 mm 4 * 6 continuous RoHS | |
| Any other suitable part | |

Apparatus may omit features shown and/or described in connection with illustrative apparatus. Embodiments may include features that are neither shown nor described in connection with the illustrative apparatus. Features of illustrative apparatus may be combined in any suitable manner. For example, an illustrative embodiment may include features shown in connection with another illustrative embodiment.

For the sake of illustration, the steps of the illustrated processes will be described as being performed by a "system." The "system" may include one or more of the features of the apparatus and schemae that are shown in FIGS. 1-17 and/or any other suitable device or approach. The "system" may include one or more means for performing one or more of the steps described herein.

The steps of methods may be performed in an order other than the order shown and/or described herein. Embodiments may omit steps shown and/or described in connection with illustrative methods. Embodiments may include steps that are neither shown nor described in connection with illustrative methods. Illustrative method steps may be combined in any suitable manner.

Figure 18:
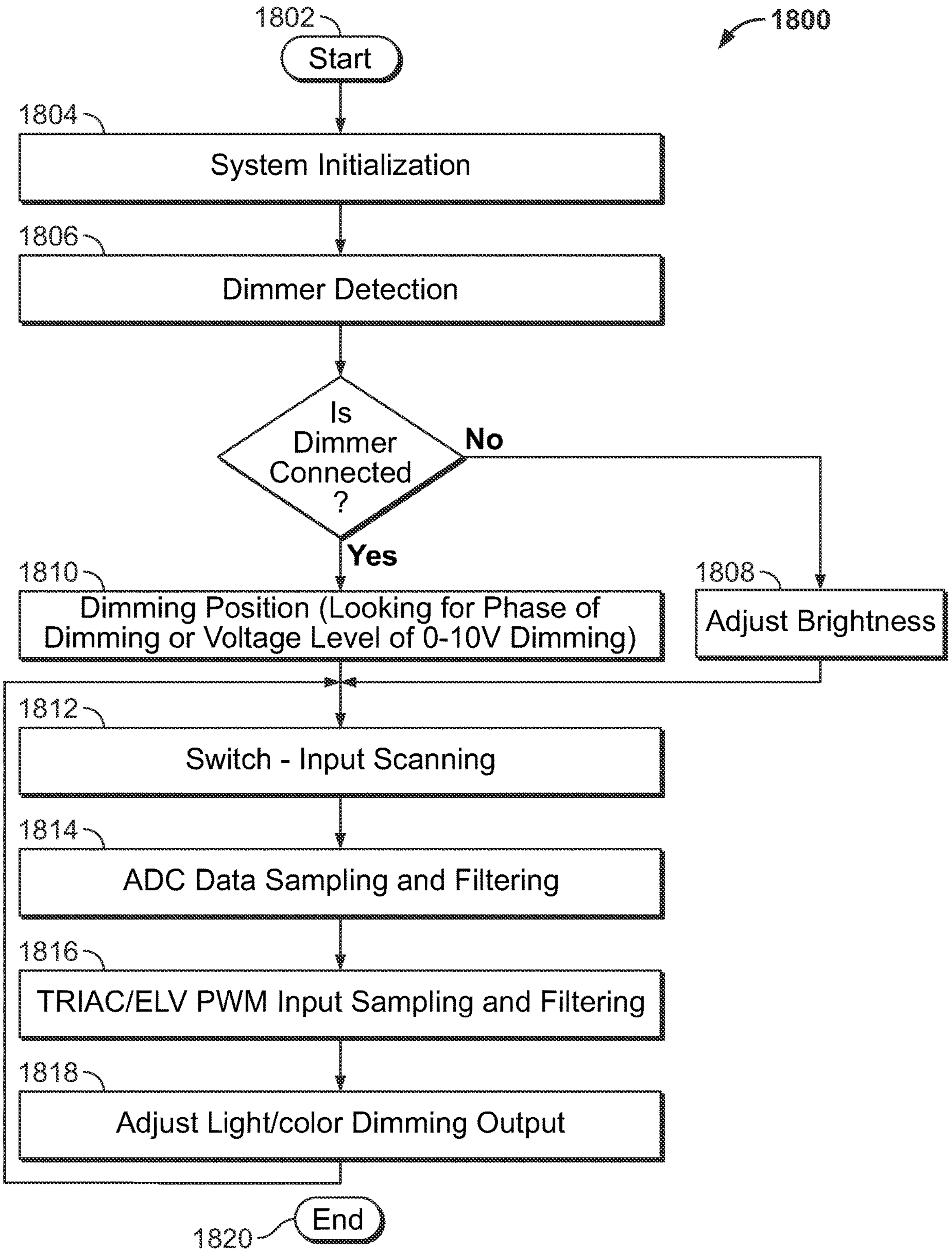
FIG. 18 shows illustrative steps of a process in accordance with principles of the invention.

FIG. 18 shows illustrative steps of process 1800. Process 1800 may be executed based on instructions. The instructions may be stored by the system. The instructions may be stored in MCU 1748 (U1). MCU 1748 (U1) may execute the instructions. One or more of the steps of process 1800 may have features in common with the features of schemae 200, 300 or any other suitable schemae.

Process 1800 may begin at step 1802. At step 1804, the system may be initialized. At step 1806, the system may detect a dimmer. The system may detect a 0-10V dimmer at pin 1792. The system may detect a Triac or ELV dimmer at pin 1794 (PB15).

If at step 1806 the system does not detect a dimmer, process 1800 may continue at step 1808. At step 1808, the system may adjust a brightness of a light source such as 118. The brightness may correspond to scene S. If at step 1806 the system does detect a dimmer, process 1800 may continue at step 1810. At step 1810, the system may detect a dimming position. The dimming position may include a voltage level (for 0-10V dimming, e.g.). The voltage level may be received at pin 1792. The dimming position may include a phase (for Triac or ELV dimming, e.g.). The phase may be received at pin 1794 (PB15).

From step 1808, process 1800 may continue at step 1812. From step 1810, process 1800 may continue at step 1812.

At step 1812, the system may scan for input from a switch. The system may scan through one or more of pins 17142 (PA2), 17144 (PA1), 17146 (PB5), 17148 (PA3/AD0), 17150 (PB7), for switch settings from outputs 1780 (P01), 1782 (P02), 1784 (P03), 1786 (P04) and 1788 (P05), respectively. The input may include a CCT partition such as Rr. The input may include a selected lighting power. The selected lighting power may be a lighting power such as $PSLP_1$ or $PSLP_2$. The selected lighting power may be a lighting power such as $PSLP_3$ or $PSLP_4$. The system may identify a CCT partition curve $M_{i,j}$ based on the input. The input may include a mode such as a mode in which the CCT partition set-point is at a low end of a lighting power adjustment (dim-to-warm). The input may include a mode such as a mode in which the CCT partition set-point is at a high end of a lighting power adjustment (brighten-to-warm).

At step 1814, the system may perform analog-to-digital converter ("ADC") data sampling. At step 1814, the system may perform analog-to-digital converter ("ADC") data filtering. Step 1814 may be performed on one or more analog signals received by MCU 1748 (U1).

At step 1816, the system may perform analog-to-digital converter ("ADC") data sampling. At step 1816, the system may perform analog-to-digital converter ("ADC") data filtering. Step 1816 may be performed on one or more of AD output voltage 1754, PWM output 1768 (VC1), a signal from conductor 1781, outputs 1780 (P01), 1782 (P02), 1784 (P03), 1786 (P04) and 1788 (P05) and any other suitable signal.

At step 1818, the system may adjust one or both of signals 17102 (PWM1) and 17106 (PWM2) to adjust a lighting power of the first LED string and the second LED string. The system may adjust the lighting powers of the first and second LED strings in conformance with on one or more of AD output voltage 1754, PWM output 1768 (VC1), a signal from conductor 1781, outputs 1780 (P01), 1782 (P02), 1784 (P03), 1786 (P04) and 1788 (P05) and any other suitable signal to achieve lighting such as that of scheme 200 or scheme 300, or any other suitable lighting scheme.

Process 1800 may end at step 1820.

Process 1800 may be embodied in whole or in part as a method, a control system, or a computer program product.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 10.4, 3 to 8, 4 to 7), and finally to each number 1, 2, 3, 4, 5, 6, 7, 8, 10, and 10 contained within the range.

Thus, apparatus and methods for LED lighting have been provided. Persons skilled in the art will appreciate that the present invention can be practiced by other than the described examples, which are presented for purposes of illustration rather than of limitation. The present invention is limited only by the claims that follow.

What is claimed is:

1. Apparatus for lighting, the apparatus comprising:
- a power supply;
- a controller configured to:
  - receive power from the power supply;
  - receive a dimming signal generated external to the controller;
  - receive a user selection that includes a CCT partition set-point;
  - transmit to a light source lighting power that corresponds to:
    - the dimming signal; and
    - the CCT partition set-point;

wherein the light source includes:
- a high correlated color temperature ("CCT") LED; and
- a low CCT LED; and
- the CCT partition set-point corresponds to a selected value of a partition of power between the high CCT LED and the low CCT LED;

wherein:
- the partition ranges from a high CCT partition to a low CCT partition;
- the lighting power ranges from a high lighting power to a low lighting power; and
- the controller includes a correlation between:
  - the lighting power; and
  - the partition.

2. The apparatus of claim 1 wherein the selected value corresponds to the low lighting power.

3. The apparatus of claim 1 wherein the selected value corresponds to the high lighting power.

4. The apparatus of claim 1 wherein the correlation includes;
- a high-CCT partition that corresponds to a high lighting power; and
- a low-CCT partition that corresponds to a low lighting power.

5. The apparatus of claim 1, wherein the correlation includes:
- a low-CCT partition that corresponds to a high lighting power; and
- a low-CCT partition that corresponds to a low lighting power.

6. The apparatus of claim 1 wherein the controller is configured:
- to receive the dimming signal from a wall-mounted dimmer switch; and
- not receive the user selection from the wall-mounted dimmer switch.

7. The apparatus of claim 6 wherein the wall-mounted dimmer switch is a wall-mounted dimmer switch that is not configured to receive the user selection.

8. The apparatus of claim 6 wherein the controller is further configured to receive a partition setting from the wall-mounted dimmer switch.

9. The apparatus of claim 1 wherein the controller includes a CCT partition set-point switch that is configured to receive the user selection.

10. The apparatus of claim 9 wherein the CCT partition set-point switch is a mechanical switch.

11. The apparatus of claim 9 further comprising a housing wherein:
- the controller is disposed in the housing; and
- the CCT partition set-point switch is fixed to the housing.

12. The apparatus of claim 11 wherein the CCT partition set-point switch is:
- in electronic communication with the controller; and
- operable by a user from outside the housing.

13. The apparatus of claim 1 wherein:
- the dimming signal is received from a 0-10V dimmer switch;
- the CCT partition set-point switch is in electronic communication with a processor in the controller; and
- the processor is configured to produce the partition based on a dimming signal set at the dimmer switch.

14. The apparatus of claim 1 wherein:
- the dimming signal is received from a phase-cut dimmer switch;
- the CCT partition set-point switch is in electronic communication with a processor in the controller; and
- the processor is configured to produce the partition based on a dimming signal set at the dimmer switch.

15. The apparatus of claim 1 wherein the CCT partition set-point switch is configured to receive a wireless signal that includes the user selection.

16. The apparatus of claim 1 wherein the user selection includes the correlation.

* * * * *